(12) United States Patent
Uesaka

(10) Patent No.: US 9,390,113 B2
(45) Date of Patent: Jul. 12, 2016

(54) DATA COLLECTING DEVICE AND SYSTEM COMMUNICATING WITH SAME

(75) Inventor: Hiroyuki Uesaka, Osaka (JP)

(73) Assignee: YANMAR CO., LTD., Osaka-shi (JP)

(*) Notice: Subject to any disclaimer, the term of this patent is extended or adjusted under 35 U.S.C. 154(b) by 173 days.

(21) Appl. No.: 13/981,431

(22) PCT Filed: Jan. 31, 2012

(86) PCT No.: PCT/JP2012/052067
§ 371 (c)(1),
(2), (4) Date: Jul. 24, 2013

(87) PCT Pub. No.: WO2012/111420
PCT Pub. Date: Aug. 23, 2012

(65) Prior Publication Data
US 2013/0311526 A1 Nov. 21, 2013

(30) Foreign Application Priority Data

Feb. 15, 2011 (JP) ................. 2011-029380

(51) Int. Cl.
*G06F 17/00* (2006.01)
*G06F 17/30* (2006.01)
(Continued)

(52) U.S. Cl.
CPC ...... *G06F 17/30312* (2013.01); *G05B 19/0428* (2013.01); *G06F 17/30598* (2013.01); *H04L 67/10* (2013.01); *H04L 67/12* (2013.01); *H04L 67/16* (2013.01)

(58) Field of Classification Search
CPC .......................... G06F 17/30598; H04L 67/10
USPC .......... 395/670, 674; 707/707, 770; 709/224, 709/201, 202; 718/104; 719/318, 310
See application file for complete search history.

(56) References Cited

U.S. PATENT DOCUMENTS 6,415,333 B1 * 7/2002 Vasell ...................... G06F 9/50
709/201
7,454,542 B2 * 11/2008 Illowsky ............... G06F 1/3203
710/62
(Continued)

FOREIGN PATENT DOCUMENTS

JP 2003-256033 A 9/2003
JP 2007-240436 A 9/2007
(Continued)

OTHER PUBLICATIONS

International Search Report dated Mar. 19, 2012, issued for PCT/JP2012/052067.

*Primary Examiner* — Marc Filipczyk
(74) *Attorney, Agent, or Firm* — Locke Lord LLP

(57) ABSTRACT

A data collecting device 200, before starting to collect function data A to E, communicates with all electronic control units 101 to 107 in a system 100 to recognize functions A to E controlled by the electronic control units 101 to 107, generate unit-specific function list information LD1 which is a list of functions A to E categorized by function type and by electronic control unit, and select at least one of the functions about which function data is to be collected. The data collecting device 200 then communicates by using at least one of electronic control units corresponding to the at least one selected function as at least one communication address, on the basis of the generated unit-specific function list information, to collect function data about the at least one function corresponding to a selection information set.

3 Claims, 17 Drawing Sheets

(51) Int. Cl.
*H04L 29/08* (2006.01)
*G05B 19/042* (2006.01)

(56) References Cited

U.S. PATENT DOCUMENTS

| | | | |
|---|---|---|---|
| 7,716,671 B2 * | 5/2010 | Lee | G06Q 10/02 709/248 |
| 8,131,713 B2 * | 3/2012 | Weissman et al. | 707/718 |
| 2007/0213895 A1 | 9/2007 | Nakayama | |
| 2009/0187289 A1 | 7/2009 | Teramura et al. | |
| 2011/0022809 A1 * | 1/2011 | Satoh et al. | 711/155 |

FOREIGN PATENT DOCUMENTS

| | | |
|---|---|---|
| JP | 2008-070133 A | 3/2008 |
| JP | 2009-051345 A | 3/2009 |
| JP | 2009-175947 A | 8/2009 |
| JP | 2010-215008 A | 9/2010 |

* cited by examiner

FIG.2

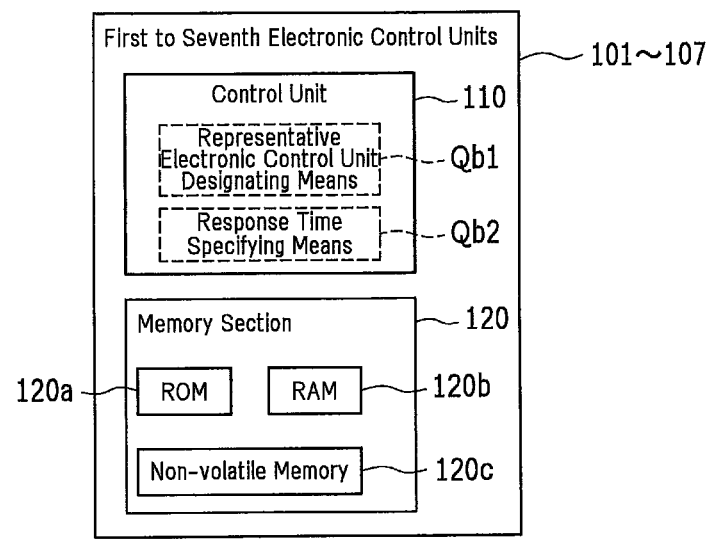

FIG.3

|  | A<br>Travel Control Function | B<br>Reaping Function | C<br>Threshing Function | D<br>Engine Actuation Function | E<br>Metering Function |
|---|---|---|---|---|---|
| 101 First Electronic Control Unit | ○ | — | ○ | — | — |
| 102 Second Electronic Control Unit | — | — | ○ | — | — |
| 103 Third Electronic Control Unit | ○ | ○ | ○ | — | — |
| 104 Fourth Electronic Control Unit | ○ | ○ | — | — | — |
| 105 Fifth Electronic Control Unit | — | — | — | ○ | — |
| 106 Sixth Electronic Control Unit | — | — | — | ○ | — |
| 107 Seventh Electronic Control Unit | — | — | — | — | ○ |

FIG.9

| | Travel Control Function | Reaping Function | Threshing Function | Engine Actuation Function | Metering Function |
|---|---|---|---|---|---|
| | A | B | C | D | E |
| | Presence/ Absence | Presence/ Absence | Presence/ Absence | Presence/ Absence | Presence/ Absence |
| KS1 — First Electronic Control Unit [ 0001 ] | 1 | | 1 | | |
| KS2 — Second Electronic Control Unit [ 0002 ] | | | 1 | | |
| KS3 — Third Electronic Control Unit [ 0003 ] | 1 | 1 | 1 | | |
| KS4 — Fourth Electronic Control Unit [ 0004 ] | 1 | 1 | | | |
| KS5 — Fifth Electronic Control Unit [ 0005 ] | | | | 1 | |
| KS6 — Sixth Electronic Control Unit [ 0006 ] | | | | 1 | |
| KS7 — Seventh Electronic Control Unit [ 0007 ] | | | | | 1 |

| | A<br>Travel Control Function | B<br>Reaping Function | C<br>Threshing Function | D<br>Engine Actuation Function | E<br>Metering Function |
|---|---|---|---|---|---|
| 101 First Electronic Control Unit | ○ | — | ○ | — | — |
| 102 Second Electronic Control Unit | — | — | ◎ | — | — |
| 103 Third Electronic Control Unit | ◎ | ○ | ○ | — | — |
| 104 Fourth Electronic Control Unit | ○ | ◎ | — | — | — |
| 105 Fifth Electronic Control Unit | — | — | — | ○ | — |
| 106 Sixth Electronic Control Unit | — | — | — | ◎ | — |
| 107 Seventh Electronic Control Unit | — | — | — | — | ○ |

FIG. 14 (a) Second Electronic Control Unit 102
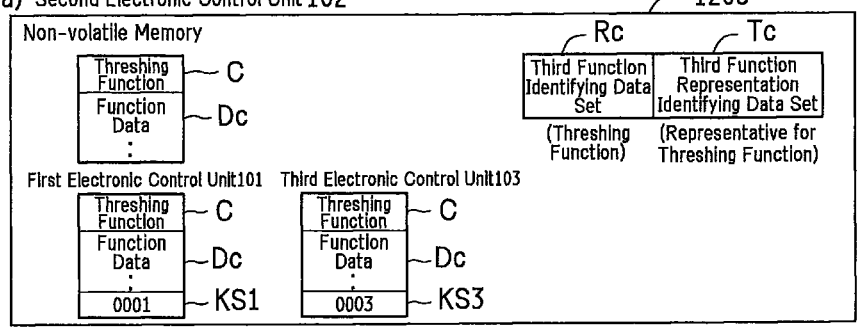
(b) Third Electronic Control Unit 103
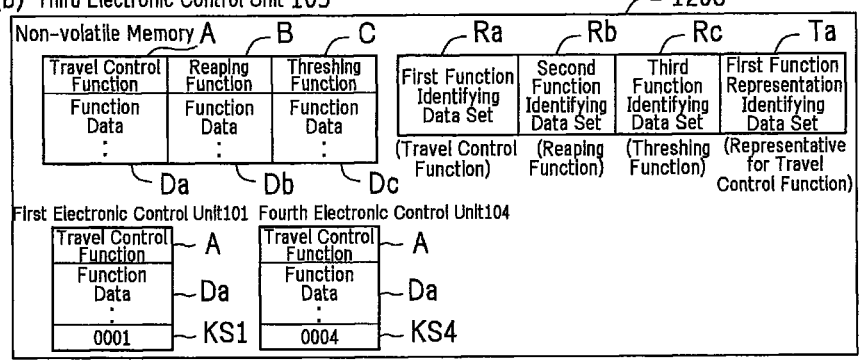
(c) Fourth Electronic Control Unit 104
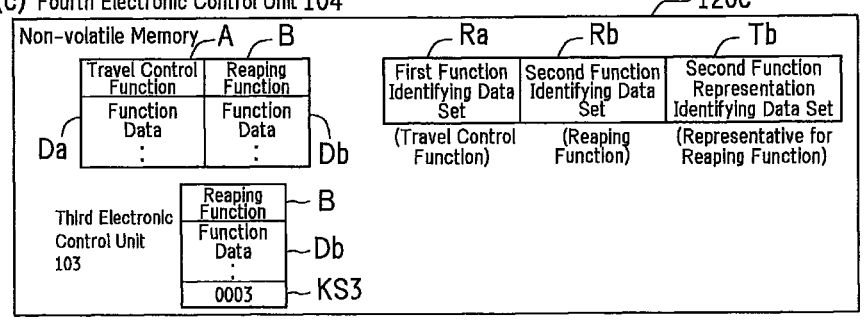
(d) Sixth Electronic Control Unit 106
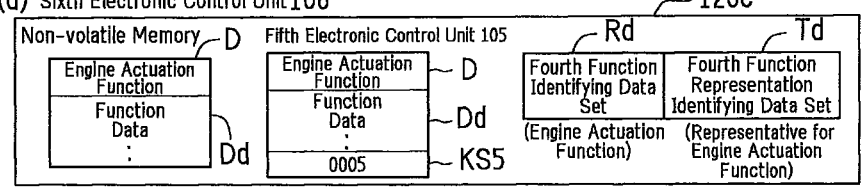

FIG.16

| | Travel Control Function | | Reaping Function | | Threshing Function | | Engine Actuation Function | | Metering Function | |
|---|---|---|---|---|---|---|---|---|---|---|
| | Presence/Absence | Rep. | Presence/Absence | Rep. | Presence/Absence | Rep. | Presence/Absence | Rep. | Presence/Absence | Rep. |
| First Electronic Control Unit [0001] (KS1) | 1 | | | | 1 | | | | | |
| Second Electronic Control Unit [0002] (KS2) | | | | | 1 | 1 | | | | |
| Third Electronic Control Unit [0003] (KS3) | 1 | 1 | 1 | | 1 | | | | | |
| Fourth Electronic Control Unit [0004] (KS4) | 1 | | 1 | 1 | | | | | | |
| Fifth Electronic Control Unit [0005] (KS5) | | | | | | | 1 | | | |
| Sixth Electronic Control Unit [0006] (KS6) | | | | | | | 1 | 1 | | |
| Seventh Electronic Control Unit [0007] (KS7) | | | | | | | | | 1 | |

TB2, 222, LD2

DATA COLLECTING DEVICE AND SYSTEM COMMUNICATING WITH SAME

TECHNICAL FIELD

The present invention relates to a data collecting device which, by communicating with a system including electronic control units controlling various functions, collects function data about the functions and also relates to the system communicating with the data collecting device.

BACKGROUND ART

Electronic control units (ECUs) for various functions are mounted throughout a system, such as working machinery (a combine harvester, a tiller, etc.) and a ship (a pleasure boat, a fishing boat, etc.), in order to control the functions.

A combine harvester (or simply combine), as an example of such a system, has various functions including threshing, travel control, reaping, engine actuation, and metering and is provided with one or more electronic control units each controlling at least one of these functions. If two or more electronic control units are provided, some functions may be covered by more than one electronic control unit. Specifically, threshing functions may be controlled by three electronic control units: a first one primarily for the control of functions after the threshing, a second one primarily for the control of functions during the threshing, and the last one primarily for the control of functions of the whole combine harvester. Travel control functions may be controlled by three electronic control units: a first one primarily for the control of functions after the threshing, a second one primarily for the control of functions of the whole combine harvester, and the last one primarily for the control of reaping functions. Reaping functions may be controlled by two electronic control units: a first one primarily for the control of functions of the whole combine harvester and the other one primarily for the control of reaping functions.

In addition, each electronic control unit is adapted to, as necessary, record and store history record information (e.g., history and accumulated information) on function data about various functions, for example, input signals (detection signals) obtained from various sensors, output signals (actuation signals) fed to various actuators, such as electromagnetic valves, and measurement signals obtained from measuring instruments.

A system equipped with these electronic control units may be connected to a data collecting device via a USB (universal serial bus) port or other interface. The data collecting device may be, for example, a laptop or like mobile personal computer with a data collecting program.

The data collecting device, once connected to the system, collects function data stored in the electronic control units in the system to aggregate and analyze the function data or to diagnose errors.

Conventionally, when a data collecting device is connected to the system to collect function data about various functions as above, the data collecting device communicates, for each function, with all electronic control units in the system to check presence/absence of the function before collecting function data about the function. This way of collecting function data is disadvantageously time-consuming.

Especially, when function data needs to be collected about a plurality of functions, the time taken to collect function data increases with the number of functions about which function data is to be collected because, for each function, the data collecting device needs to communicate with all electronic control units to check presence/absence of that function and subsequently collect and process function data about the function until this process is repeated for all the functions.

The process will be described more specifically in reference to FIG. 18 which is a system configuration diagram schematically illustrating a conventional data collecting device Y which, connected to a system X, collects history record information on function data Da to Di about various functions A to I.

The system X shown in FIG. 18 is adapted to be connected to the data collecting device Y via a USB port or other interface Z.

The system X includes a first electronic control unit ECU1 controlling functions A and B, a second electronic control unit ECU2 controlling functions B and C, a third electronic control unit ECU3 controlling functions C and D, a fourth electronic control unit ECU4 controlling functions D and E, a fifth electronic control unit ECU5 controlling functions E and F, a sixth electronic control unit ECU6 controlling functions F and G, a seventh electronic control unit ECU7 controlling functions G and H, and an eighth electronic control unit ECU8 controlling functions H and I.

The first to eighth electronic control units ECU1 to ECU8 are connected to each other over a network N, such as a CAN (controller area network) acting as an in-vehicle LAN (local area network), for two-way data communications.

The first electronic control unit ECU1 stores history record information on function data Da and Db about functions A and B. Likewise, the second to eighth electronic control units ECU2 to ECU8 respectively store history record information on function data Db and Dc about functions B and C, history record information on function data Dc and Dd about functions C and D, history record information on function data Dd and De about functions D and E, history record information on function data De and Df about functions E and F, history record information on function data Df and Dg about functions F and G, history record information on function data Dg and Dh about functions G and H, and history record information on function data Dh and Di about functions H and I.

For at least one of functions A to I, the data collecting device Y communicates with all the electronic control units ECU1 to ECU8 in the system X to check presence/absence of the function(s) before collecting history record information on function data about the function(s).

For example, to collect history record information on function data Da, Dc, and De about functions A, C, and E, the data collecting device Y first asks the first electronic control unit ECU1 whether it controls function A, i.e., whether it possesses function data Da about function A. Since the first electronic control unit ECU1 possesses function data Da about function A, the first electronic control unit ECU1 returns to the data collecting device Y a message that it possesses function data Da about function A. The data collecting device Y recognizes that the first electronic control unit ECU1 possesses function data Da about function A and collects history record information on function data Da about function A from the first electronic control unit ECU1. Next, the data collecting device Y asks the second electronic control unit ECU2 whether it possesses function data Da about function A. Since the second electronic control unit ECU2 does not possess function data Da about function A, the second electronic control unit ECU2 returns to the data collecting device Y a message that it does not possess function data Da about function A. Subsequently, the same procedures are repeated with the third to eighth electronic control units ECU3 to ECU8. After that, the whole process described so far is performed on function C and then function E as well.

The data collecting device Y communicates with the first to eighth electronic control units ECU1 to ECU8 sequentially for each of functions A, C, and E as detailed above. Therefore, the time taken to collect function data increases with the number of functions about which function data is to be collected and the number of electronic control units.

This problem is addressed by Patent Document 1 (for example, paragraphs [0034] and [0035]) which discloses a configuration in which a system including a plurality of electronic control units (ECUs) is provided in advance with a system-type table containing various data for each system type to facilitate data collection from the system.

CITATION LIST

Patent Literature

Patent Document 1: Japanese Patent Application Publication, Tokukai, No. 2008-70133

SUMMARY OF THE INVENTION

Technical Problem

The configuration of Patent Document 1 where the system is provided in advance with a system-type table containing various data for each system type will encounter no problems as long as no addition, alteration, or deletion is made to the system functions. The configuration, however, requires maintenance work to be performed on the system-type table if any addition, alteration, or deletion is made to the system functions. Additional steps are thus needed to implement the maintenance work on the system-type table.

Accordingly, it is an object of the present invention to provide a data collecting device which, by communicating with a system including electronic control units controlling various functions, collects function data about the functions, wherein the device requires no system-type table to be provided in advance in the system to collect function data about the functions from the system and is thus capable of reducing the time taken to collect the function data. It is also an object of the present invention to provide the system communicating with the data collecting device.

Solution to Problem

A data collecting device of the present invention is, to address the problem detailed above, a data collecting device communicating with a system including electronic control units controlling various functions to collect function data about the functions, the data collecting device including: a list information generating section which, before starting to collect function data, communicates with all the electronic control units in the system to recognize the functions controlled by the electronic control units and generate unit-specific function list information which is a list of the functions categorized by function type and by electronic control unit; a function selecting section which selects at least one function type about which function data is to be collected; and a data collecting section which communicates by using at least one of the electronic control units which corresponds to the at least one function selected by the function selecting section as at least one communication address on the basis of the unit-specific function list information generated by the list information generating section to collect function data about the at least one function corresponding to the selection information.

According to the present invention, unit-specific function list information which is a list of functions categorized by function type and by electronic control unit is generated before starting to collect function data. Therefore, no system-type tables need to be prepared in advance. In addition, the data collecting section communicates by using the electronic control units corresponding to the selected functions as communication addresses on the basis of the unit-specific function list information to collect function data. The presence/absence of the corresponding individual functions can be therefore checked without having to communicate with all the electronic control units in the system, which saves function data collecting time accordingly. Alternatively, the function selecting section may be configured to receive selection information generated as a result of selecting the function type about which function data is to be collected, and the data collecting section may be configured to communicate by using the electronic control units corresponding to the functions corresponding to the selection information received by the function selecting section as a communication address in order to collect function data about the functions corresponding to the selection information.

The data collecting device of the present invention may be configured so that if at least one of the functions which is controlled distributively by two or more of the electronic control units in the system is designated as a common function for at least two of the electronic control units, and a representative electronic control unit which is either one of the at least two electronic control units communicates with the other electronic control unit to obtain common function data about the common function, the list information generating section generates the unit-specific function list information containing information on the representative electronic control unit, and the data collecting section, in response to the common function selected through the function selecting section, communicates by using the representative electronic control unit as a communication address on the basis of the unit-specific function list information containing information on the representative electronic control unit to collect the common function data about the common function corresponding to the selection information.

A system of the present invention is a system communicating with the data collecting device configured as above, at least one of the functions which is controlled distributively by two or more of the electronic control units being designated as a common function for at least two of the electronic control units, the system including a representative electronic control unit designating section designating either one of the at least two electronic control units as the representative electronic control unit.

According to the system, at least one function is designated as a common function for at least two electronic control units. Unit-specific function list information containing information on a representative electronic control unit is generated before the representative electronic control unit communicates with the other electronic control units, to collect common function data about the common function. Hence, the data collecting device is able to communicate with the representative electronic control unit without having to communicate with all the electronic control units which possess the common function data about the corresponding common function. That further saves function data collecting time.

Another system of the present invention is a system communicating with the data collecting device in accordance with the present invention including a response time specifying section which, in response to the data collecting device having transmitted an identical disclosure request for any of the functions to two or more of the electronic control units, specifies a different response time for each of those two or more electronic control units for responding to the identical disclosure request.

According to the system, collisions are prevented even if the two or more electronic control units return responses related to the corresponding functions in an identical (common, single) format. That eliminates need for additional steps of retransmitting the responses, which reduces the response transmission time accordingly.

Advantageous Effects of the Invention

As described above, according to the present invention, unit-specific function list information which is a list of functions categorized by function type and by electronic control unit is generated before starting to collect function data. Therefore, no system-type tables need to be prepared in advance. In addition, the data collecting section communicates by using the electronic control units corresponding to the selected functions as communication addresses on the basis of the unit-specific function list information to collect function data. The presence/absence of the corresponding individual functions can be therefore checked without having to communicate with all the electronic control units in the system, which saves function data collecting time accordingly. In other words, the present invention reduces function data collecting time without having to provide system-type tables in advance in the system to collect function data about the functions from the system.

BRIEF DESCRIPTION OF DRAWINGS

FIG. 2 is a schematic system block diagram showing a configuration of a first to a seventh electronic control unit in the combine harvester shown in FIG. 1.

FIG. 3 is a table showing exemplary functions controlled respectively by the first to seventh electronic control units according to the first embodiment.

FIG. 9 is a table showing exemplary unit-specific function list information which is a list of functions categorized by function type (travel control function, reaping function, threshing function, engine actuation function, and metering function) and by electronic control unit (first to seventh electronic control units) in the first embodiment.

FIG. 13 is a table showing exemplary functions controlled respectively by a first to a seventh electronic control unit according to the second embodiment.

FIG. 14 is a schematic configuration diagram showing an exemplary data structure for information stored in the second, third, fourth, and sixth electronic control units according to the second embodiment, with (a) to (d) showing a data structure for a third, a first, a second, and a fourth function representation identifying data set respectively.

FIG. 16 is a table showing exemplary unit-specific function list information in the second embodiment.

DESCRIPTION OF EMBODIMENTS

The following will describe combine harvesters as systems in accordance with embodiments of the present invention by referring to the attached drawings. It should be noted that the embodiments are mere examples embodying the present invention and by no means limiting the technical scope of the present invention.

Embodiment 1

Figure 1:
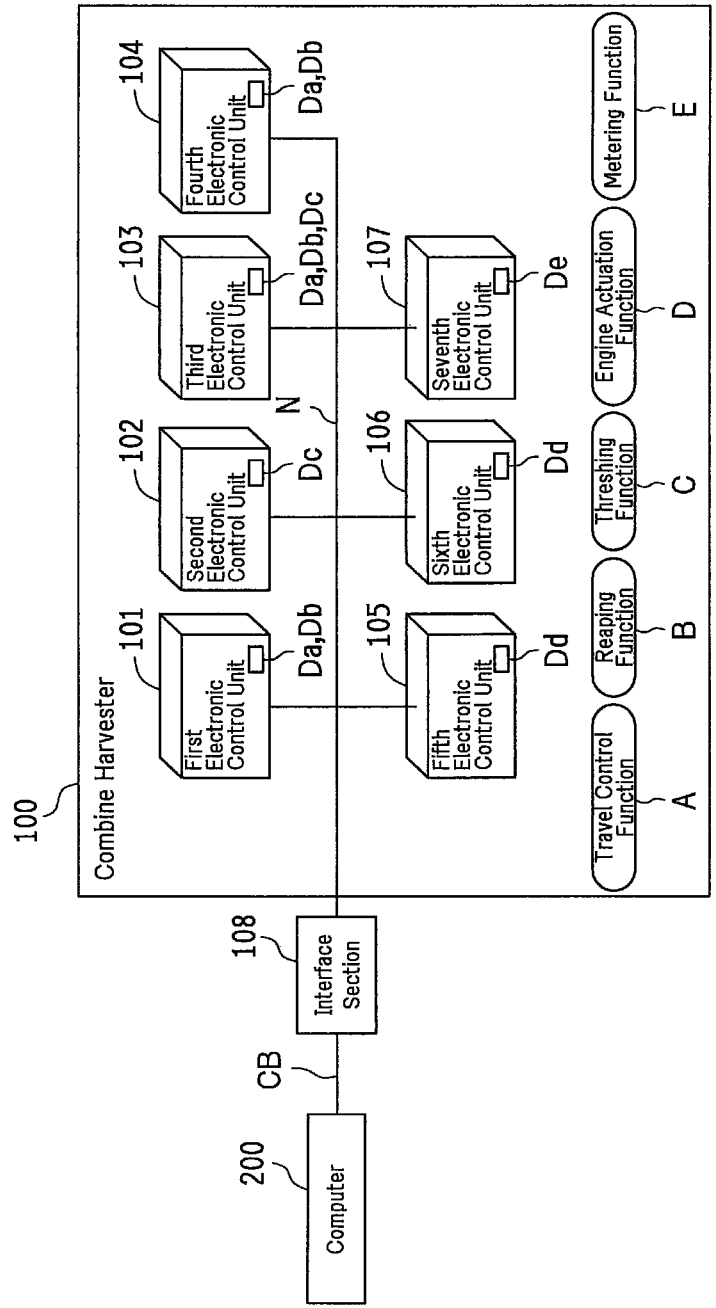
FIG. 1 is a schematic system configuration diagram showing a laptop personal computer which is an exemplary data collecting device and a combine harvester which is an exemplary system communicating with the data collecting device, according to the present invention.

FIG. 1 is a schematic system configuration diagram showing a laptop personal computer 200 which is an exemplary data collecting device and a combine harvester 100 which is an exemplary system communicating with the data collecting device, according to the present invention.

Combine Harvester

Referring to FIG. 1, the combine harvester 100 includes one or more electronic control units (here, first to seventh electronic control units 101 to 107) which control travel control function A actuating a crawler-type travel device (not shown) for travel motion, reaping function B lifting up grain stalks after plant splitting and reaping the stalks near the ground, threshing function C threshing the reaped grain stalks, engine actuation function D actuating an engine (not shown) acting as a power source for the whole combine harvester 100, and metering function E taking measurements for meters (not shown) on a driver's instrument panel.

FIG. 2 is a schematic system block diagram showing a configuration of the first to seventh electronic control units 101 to 107 in the combine harvester 100 shown in FIG. 1. The first to seventh electronic control units 101 to 107 have the same configuration. Thus, in FIG. 2, the first to seventh electronic control units 101 to 107 are represented by a single diagram, and the common elements are indicated by the same reference numerals.

The first to seventh electronic control units 101 to 107 are so-called ECUs (electronic control units), each containing a control unit 110 constituted by a CPU (central processing unit) or other computing unit and a memory section 120 constituted by a ROM (read only memory) 120a, a RAM (random access memory) 120b, and a flash memory or other rewriteable non-volatile memory 120c.

The first to seventh electronic control units 101 to 107 each perform actuation control (e.g., operation timings for various elements) by the control unit 110 loading a control program stored in advance in the ROM 120a in the memory section 120 into the RAM 120b in the memory section 120 and executing the program. The RAM 120b in the memory section 120 provides an operating work area to the control unit 110.

The first electronic control unit 101 is a post-threshing ECU primarily for controlling functions after the threshing. The second electronic control unit 102 is a peri-threshing ECU primarily for controlling functions during the threshing. The third electronic control unit 103 is an engine rear frame ECU, disposed on a rear frame (not shown) of the engine, primarily for controlling functions of the entire combine harvester. The fourth electronic control unit 104 is a reap pivotal center ECU, disposed at a reap pivotal center (not shown), primarily for controlling a reaping function. The fifth and sixth electronic control units 105 and 106 are a first and a second engine ECU, respectively, for controlling the entire engine by monitoring different types of engine rotational speeds and load conditions and sending commands related to optimal injection pressure, injection period, etc. to a fuel system. The seventh electronic control unit 107 is a center meter ECU for controlling measuring instruments for rotational speed, speed, etc.

The first to seventh electronic control units 101 to 107 each control at least one of travel control function A, reaping function B, threshing function C, engine actuation function D, and metering function E.

FIG. 3 is a table showing exemplary functions controlled by the first to seventh electronic control units 101 to 107 in the first embodiment. In FIG. 3, a circle indicates that the function is controlled by the associated electronic control unit(s).

Referring to FIG. 3, the first electronic control unit 101 controls travel control function A and threshing function C, the second electronic control unit 102 controls threshing function C, the third electronic control unit 103 controls travel control function A, reaping function B, and threshing function C, the fourth electronic control unit 104 controls travel control function A and reaping function B, the fifth and sixth electronic control units 105 and 106 control engine actuation function D, and the seventh electronic control unit 107 controls metering function E.

The first to seventh electronic control units 101 to 107 are connected to each other over a network N which is in compliance with in-vehicle LAN (specifically, CAN) standards so that the units 101 to 107 are enabled for two-way data communications.

Figure 4:
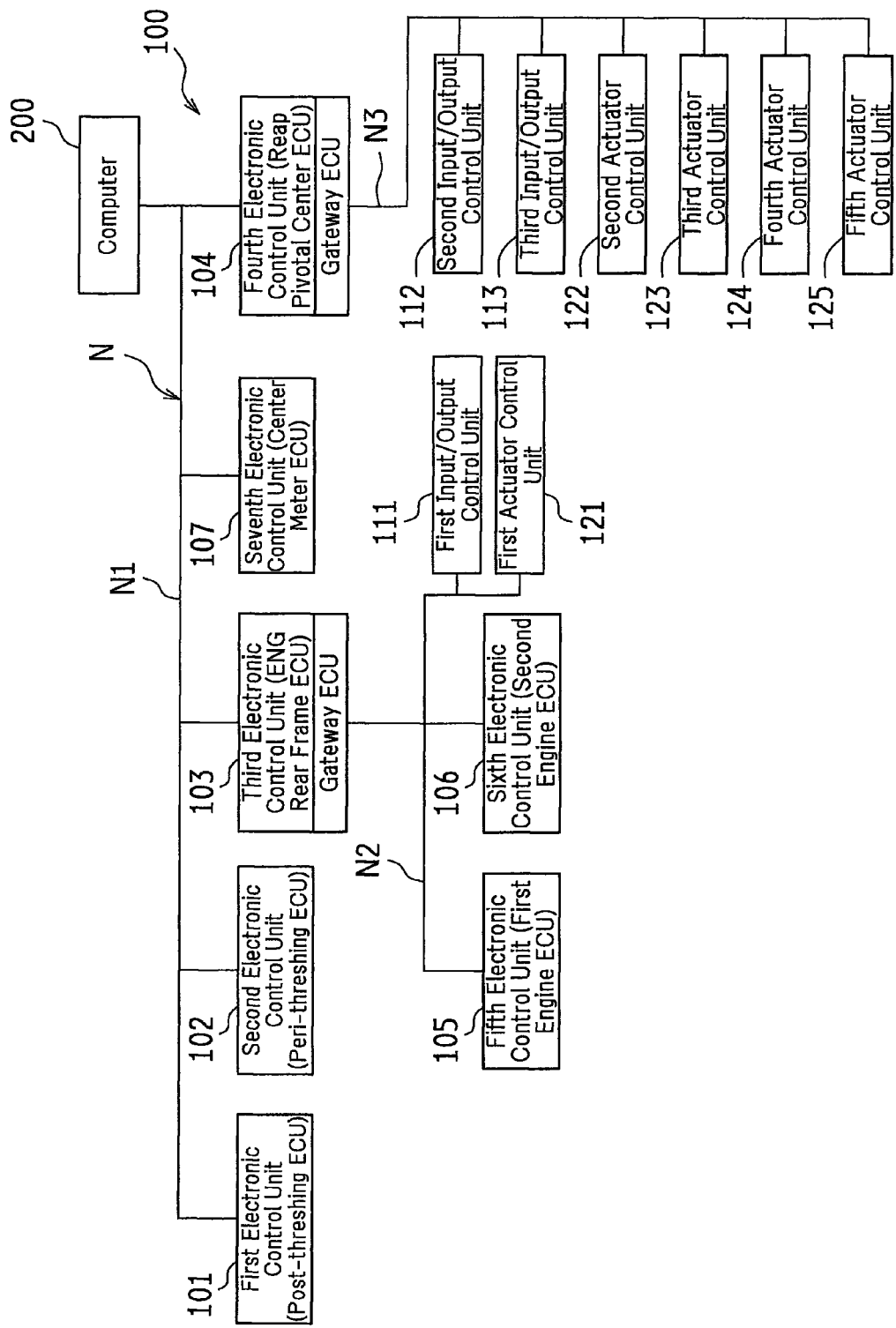
FIG. 4 is a system block diagram primarily showing how the first to seventh electronic control units are connected in the combine harvester shown in FIG. 1.

FIG. 4 is a system block diagram primarily showing how the first to seventh electronic control units 101 to 107 are connected in the combine harvester 100 shown in FIG. 1.

Referring to FIG. 4, the network N includes a first network N1 interconnecting the first to fourth and seventh electronic control units 101 to 104 and 107 for communication with the personal computer (hereinafter, simply the "computer") 200. In other words, the network N is capable of two-way data communications between any two of the first to fourth and seventh electronic control units 101 to 104 and 107 and also between the computer 200 and any of the first to fourth and seventh electronic control units 101 to 104 and 107.

The third and fourth electronic control units 103 and 104 act as a gateway ECU controlling an interfacing function for the first network N1 and each of a second and a third network N2 and N3.

More specifically, the network N includes the second network N2 interconnecting the fifth and sixth electronic control units 105 and 106, a first input/output control unit (specifically, an I/O driver) 111 primarily for controlling inputs to, and outputs from, various sensors (not shown) in the combine harvester 100, and a first actuator control unit (specifically, a proportional valve driver) 121 primarily for controlling operation of actuators (not shown) in the combine harvester 100, and communicating with the third electronic control unit 103 acting as a gateway ECU. In other words, the second network N2 is capable of two-way data communications between the fifth and sixth electronic control units 105 and 106 and also between the third electronic control unit 103 and any of the fifth and sixth electronic control units 105 and 106, the first input/output control unit 111, and the first actuator control unit 121.

The network N includes the third network N3 interconnecting a second and a third input/output control unit (specifically, I/O drivers) 112 and 113 primarily for controlling inputs to, and outputs from, various sensors (not shown) for reaping function B, and a second to a fifth actuator control units (specifically, electromagnetic valve drivers) 122 to 125 primarily for controlling operation of actuators (not shown) for reaping function B, and communicating with the fourth electronic control unit 104 acting as a gateway ECU. In other words, the third network N3 is capable of two-way data communications between the fourth electronic control unit 104 and any of the second and third input/output control units 112 and 113 and the second to fifth actuator control units 122 to 125.

Each of the first to seventh electronic control units 101 to 107, the first to third input/output control units 111 to 113, and the first to fifth actuator control units 121 to 125 is given different address information, using which information is exchanged over the networks.

For example, the first to seventh electronic control units 101 to 107 are given address information [0001] to [0007] respectively. When the computer 200 makes an enquiry to the second and third electronic control units 102 and 103, the computer 200 uses the address information [0002] and [0003] to communicate with the second and third electronic control units 102 and 103. In the first embodiment, when the computer 200 makes an enquiry to all the first to seventh electronic control units 101 to 107, the computer 200 uses the address information [9999].

The first to seventh electronic control units 101 to 107 are adapted to, as necessary, record and store history record information (e.g., history and accumulated information) on function data about various functions, for example, input signals (detection signals) obtained from various sensors, output signals (actuation signals) fed to various actuators, such as electromagnetic valves, and measurement signals obtained from measuring instruments.

Figure 5:
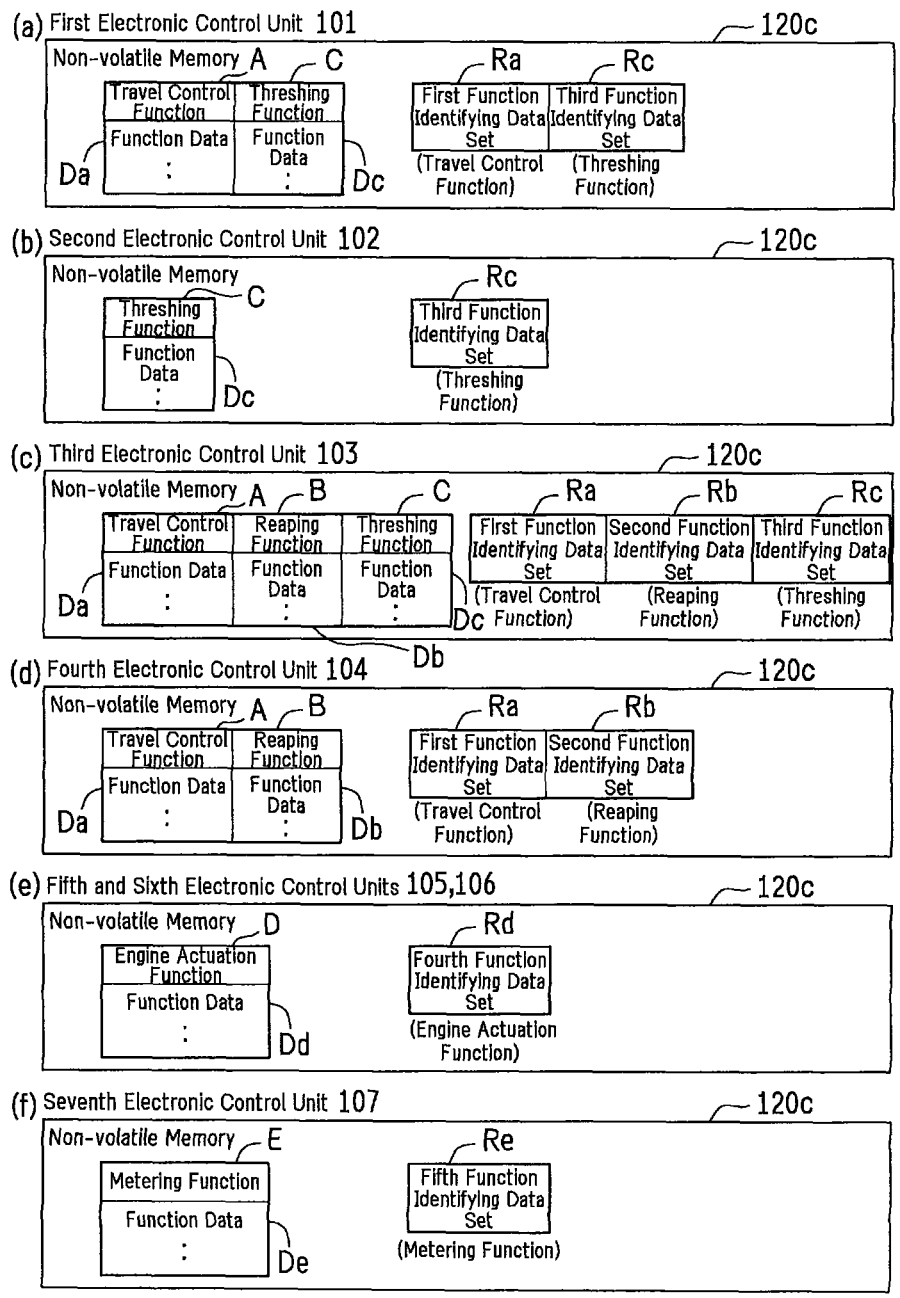
FIG. 5 is a schematic configuration diagram showing an exemplary data structure for information stored in the first to seventh electronic control units according to the first embodiment, with (a) to (f) each showing a data structure in one or two of the first to seventh electronic control units.

The first to seventh electronic control units 101 to 107 further store at least one of a first function identifying data set Ra indicating that the associated electronic control unit possesses function data Da about travel control function A, a second function identifying data set Rb indicating that the associated electronic control unit possesses function data Db about reaping function B, a third function identifying data set Rc indicating that the associated electronic control unit possesses function data Dc about threshing function C, a fourth function identifying data set Rd indicating that the associated electronic control unit possesses function data Dd about engine actuation function D, and a fifth function identifying data set Re indicating that the associated electronic control unit possesses function data De about the metering function (see FIG. 5).

FIG. 5 is a schematic configuration diagram showing an exemplary data structure for information stored in the first to seventh electronic control units 101 to 107 according to the first embodiment. FIGS. 5(*a*) to 5(*f*) each show a data structure in one or two of the first to seventh electronic control units 101 to 107. Since the fifth and sixth electronic control units 105 and 106 have the same data structure, the data structure is represented by a single diagram in FIG. 5(*e*).

Referring to FIG. 5(*a*), the non-volatile memory 120*c* in the first electronic control unit 101 has its history record information on function data Da and Dc about travel control function A and threshing function C updated as necessary and stores in advance (has specified therein) the first and third function identifying data sets Ra and Rc indicating that the first electronic control unit 101 possesses function data Da and Dc about travel control function A and threshing function C.

Referring to FIG. 5(*b*), the non-volatile memory 120*c* in the second electronic control unit 102 has its history record information on function data Dc about threshing function C updated as necessary and stores in advance (has specified therein) the third function identifying data set Rc indicating that the second electronic control unit 102 possesses function data Dc about threshing function C.

Referring to FIG. 5(*c*), the non-volatile memory 120*c* in the third electronic control unit 103 has its history record information on function data Da, Db, and Dc about travel control function A, reaping function B, and threshing function C updated as necessary and stores in advance (has specified therein) the first to third function identifying data sets Ra, Rb, and Rc indicating that the third electronic control unit 103 possesses function data Da, Db, and Dc about travel control function A, reaping function B, and threshing function C.

Referring to FIG. 5(*d*), the non-volatile memory 120*c* in the fourth electronic control unit 104 has its history record information on function data Da and Db about travel control function A and reaping function B updated as necessary and stores in advance (has specified therein) the first and second function identifying data sets Ra and Rb indicating that the fourth electronic control unit 104 possesses function data Da and Db about travel control function A and reaping function B.

Referring to FIG. 5(*e*), the non-volatile memory 120*c* in the fifth and sixth electronic control units 105 and 106 has its history record information on function data Dd about engine actuation function D updated as necessary and stores in advance (has specified therein) the fourth function identifying data set Rd indicating that the fifth/sixth electronic control unit 105/106 possesses function data Dd about engine actuation function D.

Referring to FIG. 5(*f*), the non-volatile memory 120*c* in the seventh electronic control unit 107 has its history record information on function data De about metering function E updated as necessary and stores in advance (has specified therein) the fifth function identifying data set Re indicating that the seventh electronic control unit 107 possesses function data De about metering function E.

Each of the first to seventh electronic control units 101 to 107, when any function under its control is to be changed, allows modification of the data structure of the information which it stores, in accordance with the changes. Specifically, the first to seventh electronic control units 101 to 107 are capable of updating/changing the first to fifth function identifying data sets Ra to Re stored (specified) in the associated non-volatile memory 120*c* in response to operator inputs.

The interface section 108 shown in FIG. 1, in the first embodiment, has a USB port as a wired communications means in compliance with USB standards and is capable of data communications between the network N and the computer 200.

Computer

Meanwhile, the computer 200 communicates with the combine harvester 100 to collect function data Da about travel control function A, function data Db about reaping function B, function data Dc about threshing function C, function data Dd about engine actuation function D, and function data De about metering function E.

Figure 6:
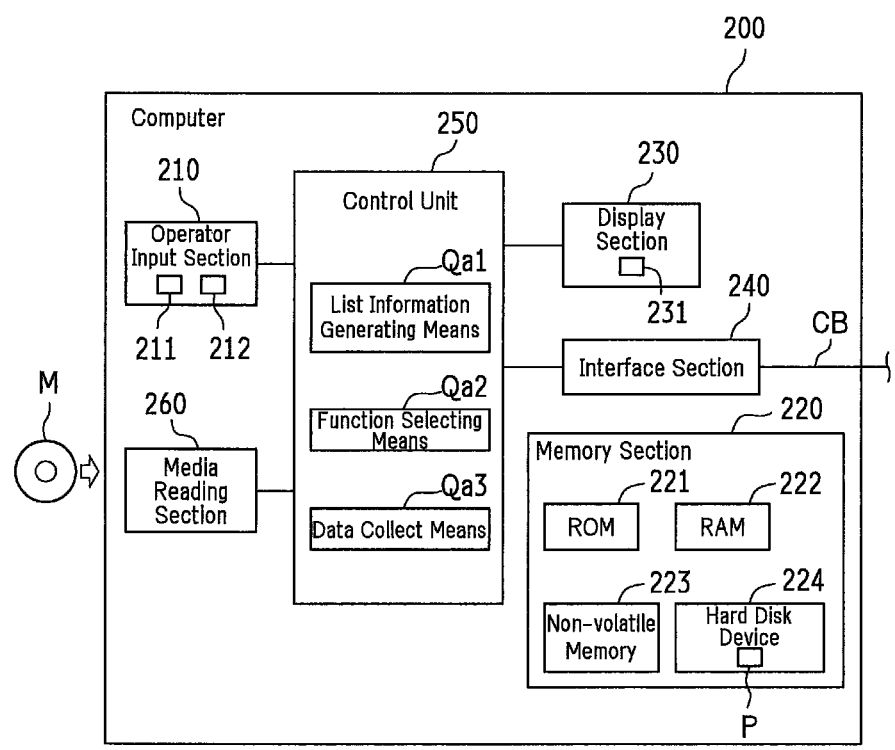
FIG. 6 is a schematic system block diagram showing a configuration of a computer communicating with the combine harvester shown in FIG. 1.

FIG. 6 is a schematic system block diagram showing a configuration of the computer 200 communicating with the combine harvester 100 shown in FIG. 1.

Referring to FIG. 6, the computer 200 acting as a data collecting device includes an operator input section 210, a memory section 220, a display section 230, an interface section 240, a control unit 250, and a media reading section 260.

The operator input section 210 includes an input device, such as a keyboard 211 or a pointing device 212, and is connected to an input system of the control unit 250. The operator input section 210 responds to an input operation from the operator by transmitting operation information entered therethrough to the control unit 250.

The memory section 220 includes memory sections, such as a ROM 221, a RAM 222, and a flash memory or other rewriteable non-volatile memory 223, and a mass storage device, such as a hard disk device 224. The hard disk device 224 stores in advance software, including a data collecting program P read by the media reading section 260 from a storage medium M, such as a CD (compact disc)-ROM, which contains the data collecting program P (which will be described later). The storage medium M may be a USB memory or an SD (secure digital) memory card. The data collecting program P may be downloaded from a server over the Internet.

The display section 230 includes a display device 231, such as a liquid crystal display panel or an EL (electro luminescence) display panel, and is connected to an output system of the control unit 250. The display device 231 displays output display information from the control unit 250 on a display screen. The display screen on the display device 231 may be provided with a touch input operation device, such as a touch panel (touchscreen). The touch input operation device is capable of input operation which corresponds to the display state of the screen display on the display screen and acts as an operator input section.

The interface section 240, in the first embodiment, is a USB port as a wired communications means in compliance with USB standards and is capable of data communications between the control unit 250 and the interface 108 of the combine harvester 100 via a USB cable CB (see FIG. 1). The interface section 240 is capable of detecting whether the interface 108 of the combine harvester 100 is connected. The computer 200 and the combine harvester 100, in the first embodiment, are connected via a USB or like wired communications means. Alternatively, they may be connected via a wireless communications means in compliance with Bluetooth® standards or IrDA (Infrared Data Association) standards.

The control unit 250 is constituted by a computing unit, such as a CPU, and performs various processes by loading software programs, such as the data collecting program P, stored in advance in the hard disk device 224 in the memory section 220 into the RAM 222 in the memory section 220 and executing those programs. The RAM 222 in the memory section 220 provides an operating work area to the control unit 250.

The control unit 250 functions as a list information generating section Qa1, a function selecting section Qa2, and a data collecting section Qa3. In other words, the data collecting program P has the control unit 250 execute steps including a list information generating step which corresponds to the list information generating section Qa1, a function selecting step which corresponds to the function selecting section Qa2, and a data collecting step which corresponds to the data collecting section Qa3.

In the list information generating step, every time procedures are started to collect function data Da to De, the computer 200 transmits a disclosure request (specifically, a command which indicates a disclosure request) for travel control function A, reaping function B, threshing function C, engine actuation function D, and metering function E to all the first to seventh electronic control units 101 to 107 in the combine harvester 100 and communicates with the first to seventh electronic control units 101 to 107 to recognize the functions controlled by the first to seventh electronic control units 101 to 107. The computer 200 then generates unit-specific function list information LD1 (see FIG. 9) which is a list of functions categorized by electronic control unit (first to seventh electronic control units 101 to 107). The unit-specific function list information LD1 thus generated is stored in the RAM 222 in the memory section 220.

Figure 7:
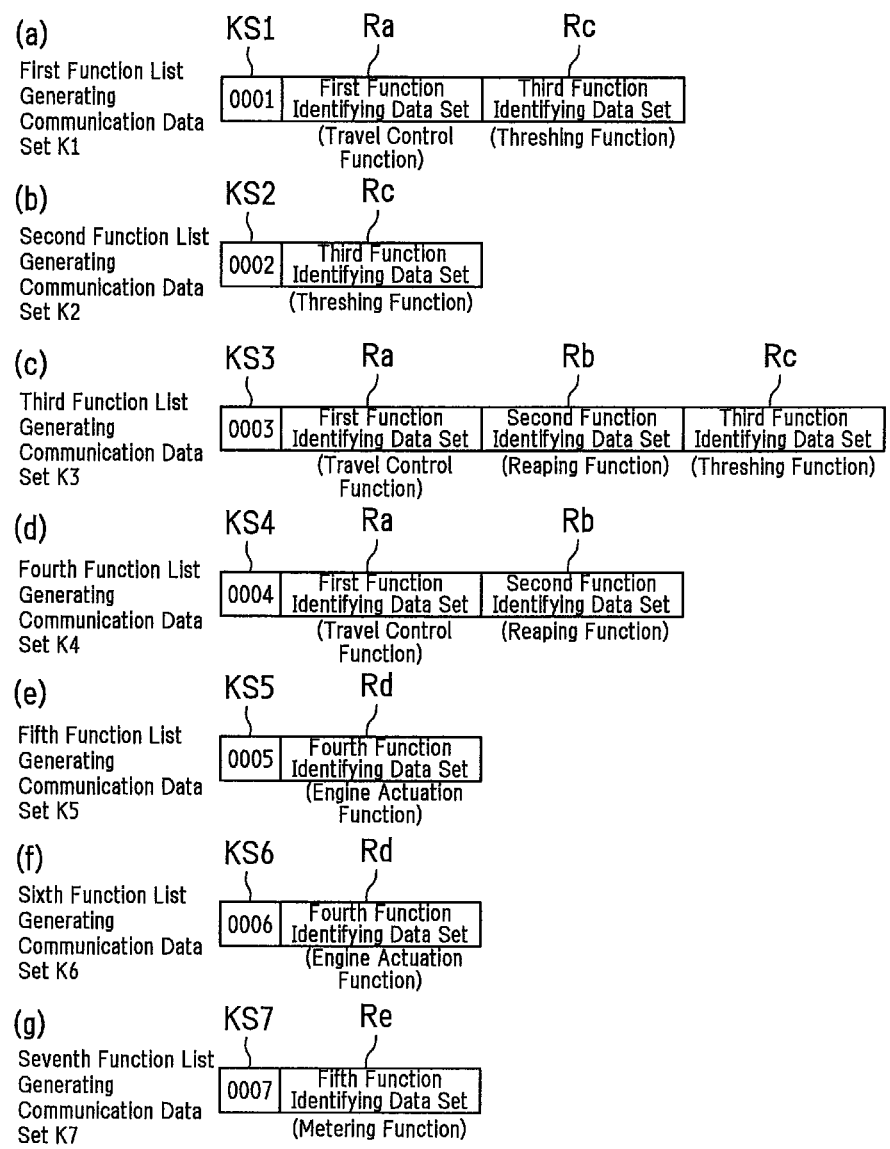
FIG. 7 is a schematic configuration diagram showing an exemplary data structure for a first to a seventh function list generating communication data set which the computer receives from the combine harvester according to the first embodiment, with (a) to (g) showing a data structure for the first to seventh function list generating communication data sets respectively.
Figure 8:
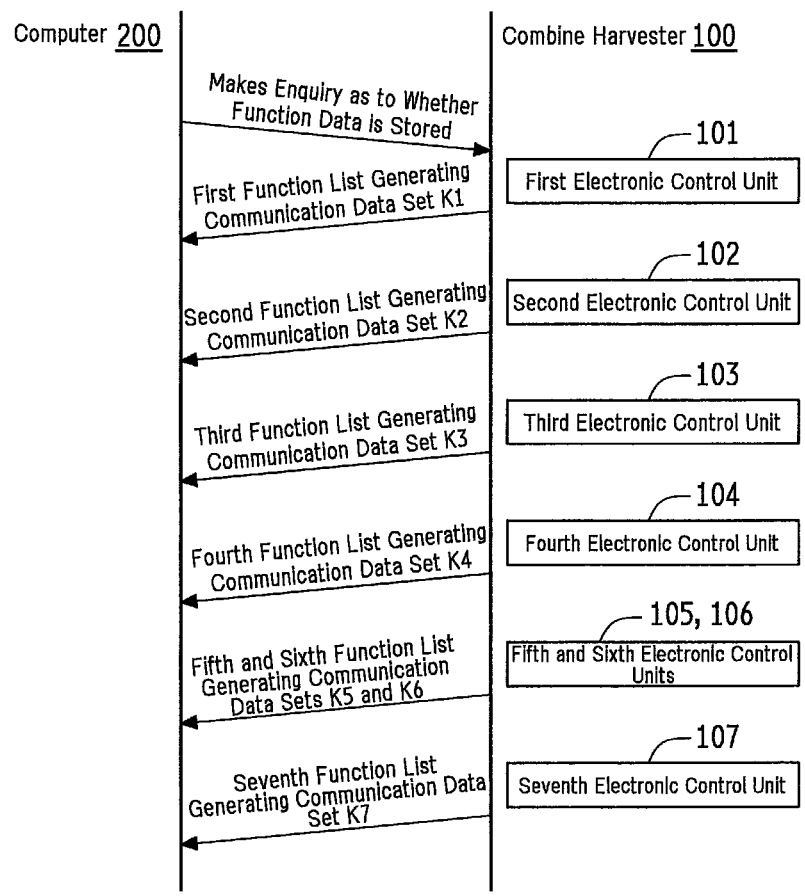
FIG. 8 is an illustration depicting communications between the computer and the combine harvester in the first embodiment.

The following will specifically describe the list information generating step in reference to FIGS. 7 to 9.

FIG. 7 is a schematic configuration diagram showing an exemplary data structure for a first to a seventh function list generating communication data set K1 to K7 which the computer 200 receives from the combine harvester 100 according to the first embodiment. FIGS. 7(*a*) to 7(*g*) show a data structure in the first to seventh function list generating communication data sets K1 to K7 respectively. FIG. 8 is an illustration depicting communications between the computer 200 and the combine harvester 100 in the first embodiment. FIG. 9 is table TB1 showing exemplary unit-specific function list information LD1 which is a list of functions categorized by function type (travel control function A, reaping function B, threshing function C, engine actuation function D, and metering function E) and by electronic control unit (first to seventh electronic control units 101 to 107) in the first embodiment. In FIG. 9, a "1" indicates that the memory flag is true.

Referring to FIG. 7(*a*), the first function list generating communication data set K1 is received by the computer 200 from the first electronic control unit 101 in the combine harvester 100 and contains a first device identifying information set KS1 (here, the address information [0001]) identifying the first electronic control unit 101, a first function identifying data set Ra indicating that the first electronic control unit 101 possesses function data Da about travel control function A, and a third function identifying data set Rc indicating that the first electronic control unit 101 possesses function data Dc about threshing function C.

Referring to FIG. 7(*b*), the second function list generating communication data set K2 is received by the computer 200 from the second electronic control unit 102 in the combine harvester 100 and contains a second device identifying information set KS2 (here, the address information [0002]) identifying the second electronic control unit 102 and a third function identifying data set Rc indicating that the second electronic control unit 102 possesses function data Dc about threshing function C.

Referring to FIG. 7(*c*), the third function list generating communication data set K3 is received by the computer 200 from the third electronic control unit 103 in the combine harvester 100 and contains a third device identifying information set KS3 (here, the address information [0003]) identifying the third electronic control unit 103, a first function identifying data set Ra indicating that the third electronic control unit 103 possesses function data Da about travel control function A, a second function identifying data set Rb indicating that the third electronic control unit 103 possesses function data Db about reaping function B, and a third function identifying data set Rc indicating that the third electronic control unit 103 possesses function data Dc about threshing function C.

Referring to FIG. 7(*d*), the fourth function list generating communication data set K4 is received by the computer 200 from the fourth electronic control unit 104 in the combine harvester 100 and contains a fourth device identifying information set KS4 (here, the address information [0004]) identifying the fourth electronic control unit 104, a first function identifying data set Ra indicating that the fourth electronic control unit 104 possesses function data Da about travel control function A, and a second function identifying data set Rb indicating that the fourth electronic control unit 104 possesses function data Db about reaping function B.

As illustrated in FIGS. 7(*e*) and 7(*f*), the fifth and sixth function list generating communication data sets K5 and K6 are received by the computer 200 from the respective fifth and sixth electronic control units 105 and 106 in the combine harvester 100 and contains respectively a fifth and a sixth device identifying information sets KS5 and KS6 (here, the address information [0005] and [0006]) identifying the fifth and sixth electronic control units 105 and 106 and commonly a fourth function identifying data set Rd indicating that the fifth/sixth electronic control units 105/106 possesses function data Dd about engine actuation function D.

Referring to FIG. 7(*g*), the seventh function list generating communication data set K7 is received by the computer 200 from the seventh electronic control unit 107 in the combine harvester 100 and contains a seventh device identifying information set KS7 (here, the address information [0007]) identifying the seventh electronic control unit 105 and a fifth function identifying data set Re indicating that the seventh electronic control unit 107 possesses function data De about metering function E.

Referring next to FIG. 8, in the list information generating step, the control unit 250 in the computer 200 first makes an enquiry to all the first to seventh electronic control units 101 to 107 in the combine harvester 100 as to which of travel control function A, reaping function B, threshing function C, engine actuation function D, and metering function E the first to seventh electronic control units 101 to 107 each control, in other words, whether or not the first to seventh electronic control units 101 to 107 each possess function data about which of these functions. Since the first electronic control unit 101 possesses function data Da and Dc about travel control function A and threshing function C, the first electronic control unit 101 returns to the computer 200 a message containing the first function list generating communication data set K1 (specifically, the first function identifying data set Ra and the third function identifying data set Rc shown in FIG. 7(*a*)) indicating that it possesses function data Da and Dc about travel control function A and threshing function C. The control unit 250 in the computer 200 checks the status of the first function list generating communication data set K1 (specifically, determines that the first function identifying data set Ra and the third function identifying data set Rc are present), recognizes that the first electronic control unit 101 possesses function data Da and Dc about travel control function A and threshing function C, and sets a flag to true in a memory area which identifies travel control function A and threshing function C in the first device identifying information set KS1 (here, the address information [0001]) corresponding to the first electronic control unit 101 in table TB1 shown in FIG. 9.

Next, since the second electronic control unit 102 possesses function data Dc about threshing function C, the second electronic control unit 102 returns to the computer 200 a message containing the second function list generating communication data set K2 (specifically, the third function identifying data set Rc shown in FIG. 7(*b*)) indicating that it possesses function data Dc about threshing function C. The control unit 250 in the computer 200 checks the status of the second function list generating communication data set K2 (specifically, determines that the third function identifying data set Rc is present), recognizes that the second electronic control unit 102 possesses function data Dc about threshing function C, and sets a flag to true in a memory area which identifies threshing function C in the second device identifying information set KS2 (here, the address information [0002]) corresponding to the second electronic control unit 102 in table TB1 shown in FIG. 9.

Next, since the third electronic control unit 103 possesses function data Da, Db, and Dc about travel control function A, reaping function B, and threshing function C, the third electronic control unit 103 returns to the computer 200 a message containing the third function list generating communication data set K3 (specifically, the first to third function identifying data sets Ra to Rc shown in FIG. 7(*c*)) indicating that it possesses function data Da, Db, and Dc about travel control function A, reaping function B, and threshing function C. The control unit 250 in the computer 200 checks the status of the third function list generating communication data set K3 (specifically, determines that the first to third function identifying data sets Ra to Rc are present), recognizes that the third electronic control unit 103 possesses function data Da, Db, and Dc about travel control function A, reaping function B, and threshing function C, and sets a flag to true in a memory area which identifies travel control function A, reaping function B, and threshing function C in the third device identifying information set KS3 (here, the address information [0003]) corresponding to the third electronic control unit 103 in table TB1 shown in FIG. 9.

Next, since the fourth electronic control unit 104 possesses function data Da and Db about travel control function A and reaping function B, the fourth electronic control unit 104 returns to the computer 200 a message containing the fourth function list generating communication data set K4 (specifically, the first and second function identifying data sets Ra and Rb shown in FIG. 7(*d*)) indicating that it possesses function data Da and Db about travel control function A and reaping function B. The control unit 250 in the computer 200 checks the status of the fourth third function list generating communication data set K4 (specifically, determines that the first and second function identifying data sets Ra and Rb are present), recognizes that the fourth electronic control unit 104 possesses function data Da and Db about travel control function A and reaping function B, and sets a flag to true in a memory area which identifies travel control function A and reaping function B in the fourth device identifying information set KS4 (here, the address information [0004]) corresponding to the fourth electronic control unit 104 in table TB1 shown in FIG. 9.

Next, since the fifth and sixth electronic control units 105 and 106 possess function data Dd about engine actuation function D, the fifth and sixth electronic control units 105 and 106 return to the computer 200 a message containing the fifth and sixth function list generating communication data sets K5 and K6 (specifically, the fourth function identifying data set Rd shown in FIGS. 7(*e*) and 7(*f*)) indicating that they possess function data Dd about engine actuation function D. The control unit 250 in the computer 200 checks the status of the fifth and the sixth function list generating communication data sets K5 and K6 (specifically, determines that the fourth function identifying data set Rd is present), recognizes that the fifth and sixth electronic control units 105 and 106 possess function data Dd about engine actuation function D, and sets a flag to true in a memory area which identifies engine actuation function D in the fifth and the sixth device identifying information sets KS5 and KS6 (here, the address information [0005] and [0006]) corresponding to the fifth and sixth electronic control units 105 and 106 in table TB1 shown in FIG. 9.

Next, since the seventh electronic control unit 107 possesses function data De about metering function E, the seventh electronic control unit 107 returns to the computer 200 a message containing the seventh function list generating communication data set K7 (specifically, the fifth function identifying data set Re shown in FIG. 7(*g*)) indicating that it possess function data De about metering function E. The control unit 250 in the computer 200 checks the status of the seventh function list generating communication data set K7 (specifically, determines that the fifth function identifying data set Re is present), recognizes that the seventh electronic control unit 107 possesses function data De about metering function E, and sets a flag to true in a memory area which identifies metering function E in the seventh electronic control unit 107 in table TB1 shown in FIG. 9.

The unit-specific function list information LD1 is thus generated which is a list of functions categorized by electronic control unit (first to seventh electronic control units 101 to 107).

In the function selecting step, at least one function type is selected to collect function data. Specifically, in the function selecting step, the computer 200 receives at least one of a first to a fifth selection information set SN1 to SN5 (see FIG. 10) corresponding respectively to travel control function A, reaping function B, threshing function C, engine actuation function D, and metering function E in order to collect function data Da to De. In the data collecting step (detailed later), the computer 200 collects function data about the function(s) corresponding to the at least one of the first to fifth selection information sets SN1 to SN5 that the computer 200 has received.

Figure 10:
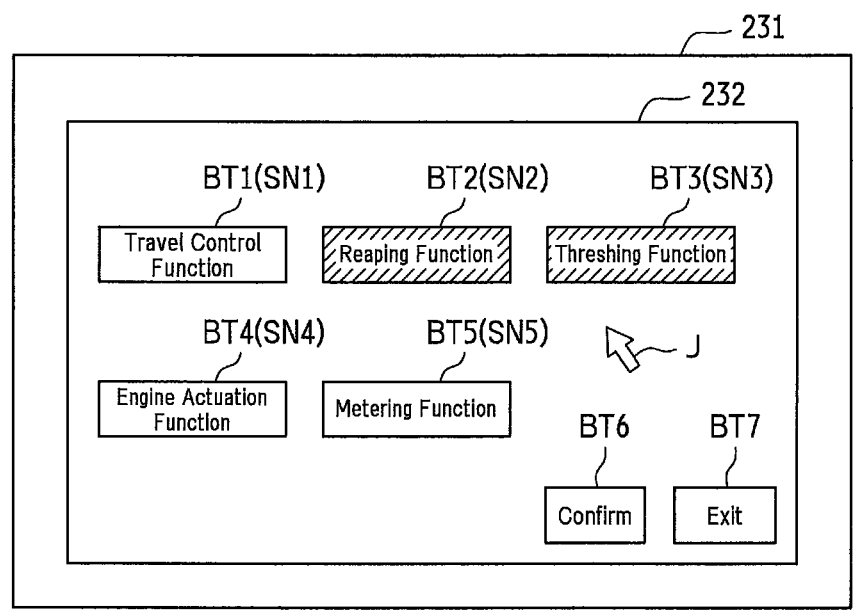
FIG. 10 is a plan view of a function selection screen displayed on a display device of the computer shown in FIG. 1.

FIG. 10 is a plan view of a function selection screen 232 displayed on a display device 231 of the computer 200 shown in FIG. 1. In FIG. 10, selected functions are indicated by hatching.

Referring to FIG. 10, displayed on the function selection screen 232 on the display device 231 are a first selection button BT1 for transmitting to the control unit 250 the first selection information set SN1 indicating that the operator has selected travel control function A, a second selection button BT2 for transmitting to the control unit 250 the second selection information set SN2 indicating that the operator has selected reaping function B, a third selection button BT3 for transmitting to the control unit 250 the third selection information set SN3 indicating that the operator has selected threshing function C, a fourth selection button BT4 for transmitting to the control unit 250 the fourth selection information set SN4 indicating that the operator has selected engine actuation function D, a fifth selection button BT5 for transmitting to the control unit 250 the fifth selection information set SN5 indicating that the operator has selected metering function E, a confirmation button BT6 for confirming selection of a function, and an exit button BT7 for exiting from the selection screen. The confirmation button BT7 becomes operable when at least one of the first to fifth selection buttons BT1 to BT5 is selected.

For example, when the operator moves the cursor J on the function selection screen 232 and performs an operation (clicks) on the function to be selected by manipulating the pointing device 212, the function type corresponding to the selection button where the cursor J is located is selected. In the first embodiment, the function thus selected is displayed differently from the non-selected functions. By performing an operation (clicks) on other non-selected functions, the operator can select two or more function types. In addition, if the operator performs an operation (clicks) on a selected function again, the function is deselected.

In the example shown in FIG. 10, the selected functions (specifically, reaping function B and threshing function C) are highlighted with respect to the non-selected functions (specifically, travel control function A, engine actuation function D, and metering function E).

If the operator performs an operation (clicks) on the confirmation button BT6 after the functions have been selected, the selected functions are confirmed, and the selection information sets on the selected functions (specifically, the second and third selection information sets SN2 and SN3) are transmitted to the control unit 250. Then, the control unit 250 selects the functions (specifically, reaping function B and threshing function C) corresponding to the received selection information sets (specifically, the second and third selection information sets SN2 and SN3) as the functions on which function data is to be collected. An operation (click) on the exit button BT7 in the function selection screen 232 will quit the selection screen. Operations on the function selection screen 232 may be performed through a touch panel (touchscreen).

Then, in the data collecting step, the computer 200 communicates by using the electronic control units corresponding to the functions corresponding to the selection information sets selected in the function selecting step as communication addresses on the basis of the unit-specific function list information LD1 (see FIG. 9) generated in the list information generating step and stored in the RAM 222, in order to collect function data about the functions corresponding to the selection information sets.

For example, in the data collecting step, as illustrated in FIG. 10, if reaping function B and threshing function C have been selected in the function selecting step, the third and fourth device identifying information sets KS3 and KS4 (here, the address information [0003] and [0004]) corresponding to the third and fourth electronic control units 103 and 104 which possess function data Db about reaping function B are retrieved from the unit-specific function list information LD1 (see FIG. 9) stored in the RAM 222 in order to collect function data Db about reaping function B. In addition, the first to third device identifying information sets KS1 to KS3 (here, the address information [0001] to [0003]) corresponding to the first to third electronic control units 101 to 103 which possess function data Dc about threshing function C are retrieved. The computer 200 communicates by using the first to fourth device identifying information sets KS1 to KS4 (here, the address information [0001] to [0004]) corresponding to the first to fourth electronic control units 101 to 104 thus retrieved as communication addresses. Specifically, in the data collecting step, history record information on function data Dc about threshing function C (see FIGS. 5(a) to 5(c)) is collected from the non-volatile memories 120c in the first to third electronic control units 101 to 103, and history record information on function data Db about reaping function B is collected (see FIGS. 5(c) and 5(d)) from the non-volatile memories 120c in the third and fourth electronic control units 103 and 104.

In the first embodiment, the first to seventh device identifying information sets KS1 to KS7 are address information [0001] to [0007]. Alternatively, the first to seventh device identifying information sets KS1 to KS7 may be other codes if a conversion table is provided which uniquely matches the first to seventh device identifying information sets KS1 to KS7 (address information [0001] to [0007]) with the other codes. The conversion table enables communication by using the address information obtained by converting the codes as communication addresses.

Using the function data Db and Dc thus collected, the computer 200 aggregates and analyzes the operation timings, detected values, etc. of various actuators or diagnoses errors. Results of the aggregation/analysis/diagnosis are displayed on a display screen (not shown) of the display device 231.

The function data may be, for example, sensor outputs and actuation signals for actuators (more specifically, fuel injection quantity, engine rotational speed, cooling water temperature, startup count, threshing cylinder and treating cylinder rotational speeds, feed chain rotational speed, reaping depth, operation time, vehicle speed, horsepower, regional specifications, etc).

Exemplary Data Collecting Process

Figure 11:
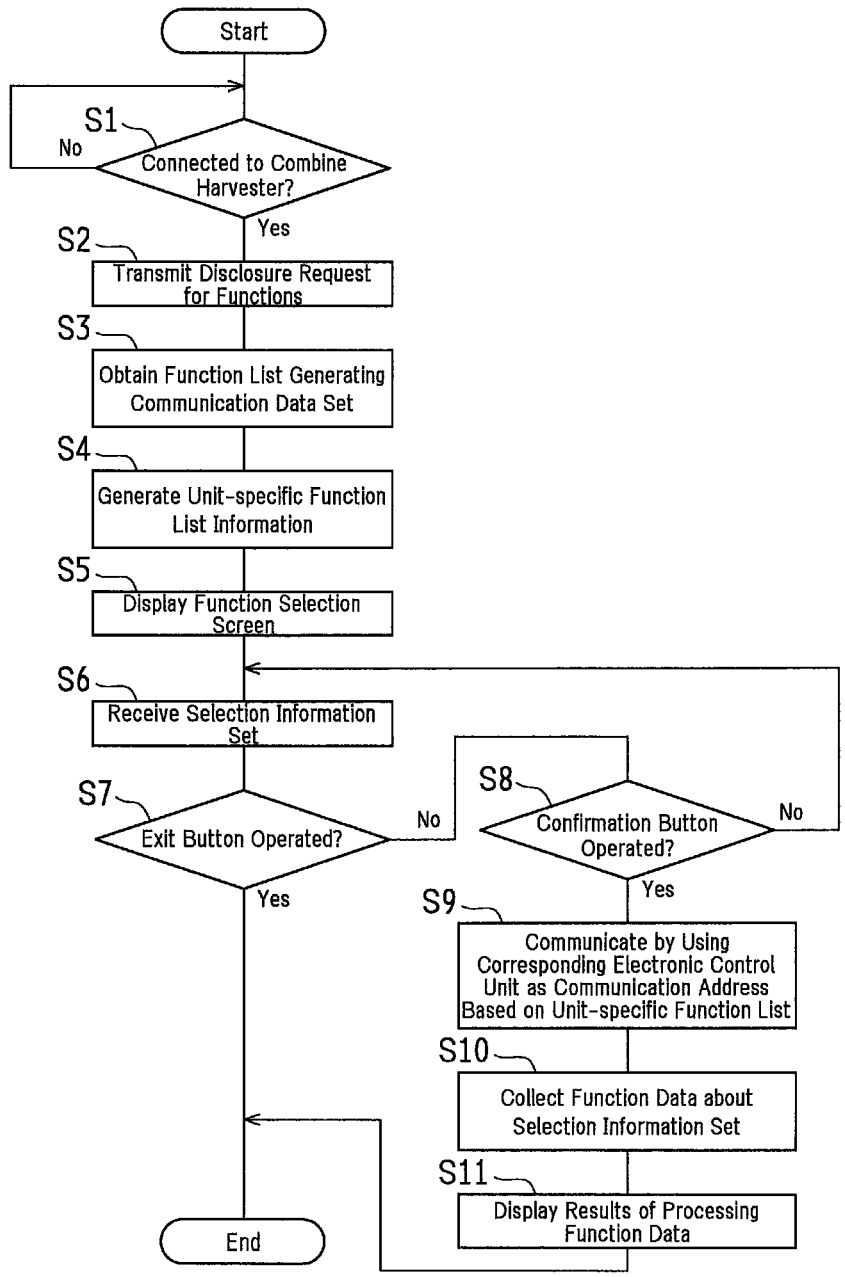
FIG. 11 is a flow chart depicting an exemplary data collecting process in accordance with the first embodiment.
Figure 12:
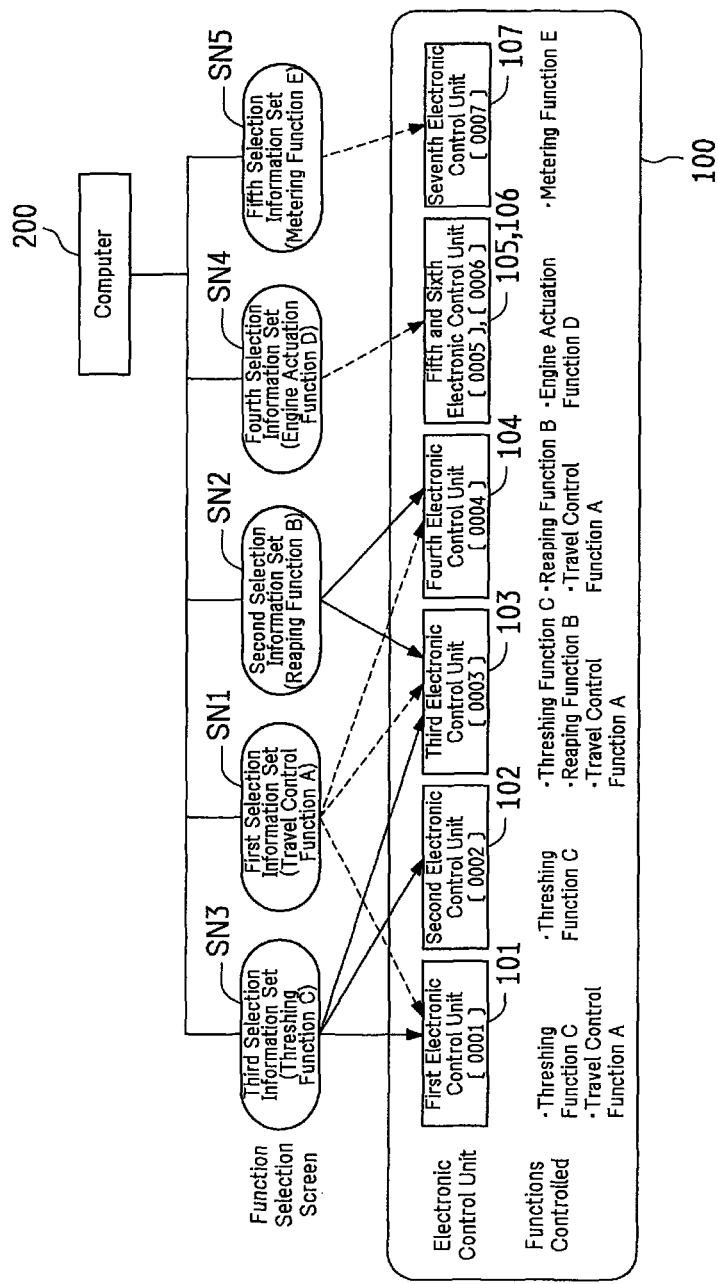
FIG. 12 is an illustration depicting the computer accessing the first to seventh electronic control units in the combine harvester in the first embodiment.

The following will describe an exemplary data collecting process in accordance with the first embodiment in reference to FIGS. 11 and 12. FIG. 11 is a flow chart depicting an exemplary data collecting process in accordance with the first embodiment. FIG. 12 is an illustration depicting the computer 200 in the combine harvester 100 accessing the first to seventh electronic control units 101 to 107 in the first embodiment.

In the flow chart of the exemplary data collecting process shown in FIG. 11, the control unit 250 first determines whether the combine harvester 100 has been connected via the interface sections 108 and 240 (step S1) and stands by until the network N is connected (No in step S1). When the network N is connected (Yes in step S1), step S2 and the subsequent part of the data collecting process is started. In this example, the control unit 250 detects the connection status between the computer 200 and the combine harvester 100 and automatically starts the data collecting process. Alternatively, the operator may manually start the data collecting process.

The control unit 250, in response to the instruction to start the data collecting process, transmits a disclosure request for travel control function A, reaping function B, threshing function C, engine actuation function D, and metering function E to all the first to seventh electronic control units 101 to 107 in the combine harvester 100 (step S2).

Next, the control unit 250 communicates with the first to seventh electronic control units 101 to 107 via the interface sections 108 and 240 and over the network N and obtains the first to seventh function list generating communication data sets K1 to K7 from the first to seventh electronic control units 101 to 107 (step S3).

Based on the first to fifth function identifying data sets Ra to Re contained in the first to seventh function list generating communication data sets K1 to K7 obtained from the first to seventh electronic control units 101 to 107, the control unit 250 selects at least one of travel control function A, reaping function B, threshing function C, engine actuation function D, and metering function E for each of the first to seventh electronic control units 101 to 107 and generates the unit-specific function list information LD1 (see FIG. 9) (step S4).

Then, the control unit 250 has the display device 231 display the function selection screen 232 (see FIG. 10) (step S5) and receives at least one of the first to fifth selection information sets SN1 to SN5 corresponding respectively to travel control function A, reaping function B, threshing function C, engine actuation function D, and metering function E (step S6).

Next, the control unit 250 determines whether the exit button BT7 has been operated (step S7). If the exit button BT7 has not been operated (No in step S7), the control unit 250 implements step S8. On the other hand, if the exit button BT7 has been operated (Yes in step S7), the control unit 250 ends the data collecting process.

In step S8, the control unit 250 determines whether the confirmation button BT6 has been operated. If the confirmation button BT6 has not been operated (No in step S8), the control unit 250 implements step S6. On the other hand, if the confirmation button BT6 has been operated (Yes in step S8), the control unit 250 implements step S9.

In step S9, based on the unit-specific function list information LD1 (see FIG. 9) generated in step S4, the control unit 250 communicates by using, as communication addresses (e.g., address information [0001] to [0004]), the electronic control units (e.g., the first to fourth electronic control units 101 to 104) corresponding to the functions corresponding to the selection information sets selected in step S7 (e.g., reaping function B and threshing function C corresponding to the second and third selection information sets SN2 and SN3 (see solid line arrows in FIG. 12)). After that, the control unit 250 implements step S10.

In step S10, the control unit 250 collects function data (e.g., function data Db about reaping function B and function data Dc about threshing function C) about the functions (e.g., reaping function B and threshing function C) corresponding to the selection information sets (e.g., the second and third selection information sets SN2 and SN3). After that, the control unit 250 implements step S11.

In step S11, the control unit 250 performs aggregation and analysis or error diagnosis using function data Db and Dc and has results displayed on the display screen of the display device 231, thereby ending the process.

As described above, according to the first embodiment, the control unit 250 communicates with all the first to seventh electronic control units 101 to 107 in the combine harvester 100 in the list information generating step before starting to collect function data Da to De, in order to recognize the functions controlled by the first to seventh electronic control units 101 to 107 and generate the unit-specific function list information LD1 which is a list of travel control function A, reaping function B, threshing function C, engine actuation function D, and metering function E categorized by function type and electronic control unit (first to seventh electronic control units 101 to 107). Therefore, the combine harvester 100 does not need to be provided with a system-type table in advance.

In addition, according to the first embodiment, the control unit 250 in the function selecting step receives the first to fifth selection information sets SN1 to SN5 containing the types of functions selected from travel control function A, reaping function B, threshing function C, engine actuation function D, and metering function E, in order to collect function data Da to Dd.

Then, in data collecting step, based on the unit-specific function list information LD1 generated in the list information generating step, the control unit 250 communicates by using, as communication addresses (e.g., address information [0001] to [0004] for the first to fourth electronic control units 101 to 104), the electronic control units corresponding to the functions (e.g., reaping function B and threshing function C) corresponding to the selection information sets (e.g., the second and third selection information sets SN2 and SN3) selected in the function selecting step. After that, the control unit 250 collects function data (e.g., function data Db and Dc) about the functions corresponding to the selection information sets (e.g., reaping function B and threshing function C corresponding to the second and third selection information sets SN2 and SN3).

Accordingly, when collecting function data (e.g., function data Db and Dc) about the functions corresponding to the selection information sets (e.g., reaping function B and threshing function C corresponding to the second and third selection information sets SN2 and SN3), the control unit 250 is able to check the presence/absence of the individual functions (e.g., reaping function B and threshing function C) without having to communicate with all the first to seventh electronic control units 101 to 107 in the combine harvester 100. That saves function data collecting time (e.g., function data Db and Dc) accordingly.

Besides, since the unit-specific function list information LD1 is generated before starting to collect function data Da to De (every time function data Da to De is to be collected), even if any addition, alteration, or deletion is made to the functions of the combine harvester 100, the list information itself requires no maintenance, which eliminates need for additional steps of maintaining the list information itself.

Embodiment 2

Now, the second embodiment will be described in the following. Note that throughout the second embodiment, those members that are arranged in the same manner as those in the first embodiment are indicated by the same reference numerals, with the description focusing on differences between the two embodiments.

In a combine harvester 100 of the second embodiment, at least one of travel control function A, reaping function B, threshing function C, engine actuation function D, and metering function E is common ("common function") to at least two of the first to seventh electronic control units 101 to 107.

The combine harvester 100 of the second embodiment includes a representative electronic control unit designating section Qb1 (see a broken line enclosure in FIG. 2) designating either one of the at least two electronic control units which share a common function as the representative electronic control unit.

FIG. 13 is a table showing exemplary functions controlled respectively by a first to a seventh electronic control unit 101 to 107 (representative electronic control units are designated) in a system in accordance with the second embodiment. In FIG. 13, a double circle indicates a representative electronic control unit.

Referring to FIG. 13, in the combine harvester 100, travel control function A is the common function for the first, third, and fourth electronic control units 101, 103, and 104. Reaping function B is the common function for the third and fourth electronic control units 103 and 104. Threshing function C is the common function for the first to third electronic control units 101 to 103. Engine actuation function D is the common function for the fifth and sixth electronic control units 105 and 106.

Furthermore, in the combine harvester 100, the third electronic control unit 103 is the representative one of the first, third and fourth electronic control units 101, 103, and 104 for travel control function A. The fourth electronic control unit 104 is the representative one of the third and fourth electronic control units 103 and 104 for reaping function B. The second electronic control unit 102 is the representative one of the first to third electronic control units 101 to 103 for threshing function C. The sixth electronic control unit 106 is the representative one of the fifth and sixth electronic control units 105 and 106 for engine actuation function D.

FIG. 14 is a schematic configuration diagram showing an exemplary data structure for information stored in the second, third, fourth, and sixth electronic control units 102, 103, 104, and 106 (representative electronic control units are designated) in a system in accordance with the second embodiment. FIGS. 14(*a*) to 14(*d*) show a data structure for a third, a first, a second, and a fourth function representation identifying data set Tc, Ta, Tb, and Td respectively. The data structure of the information stored in the first, fifth, and seventh electronic control units 101, 105, and 107 in the second embodiment may be the same as the aforementioned example of the data structure of the information stored in the first, fifth, and seventh electronic control units 101, 105, and 107 in the first embodiment (see FIG. 5(*a*), FIG. 5(*e*), and FIG. 5(*f*). No further description will be given about the data structure of the information stored in the first, fifth, and seventh electronic control units 101, 105, and 107 in the second embodiment.

Referring to FIG. 14(*a*), the non-volatile memory 120*c* in the second electronic control unit 102 stores in advance (has specified therein) the third function representation identifying data set Tc indicating that the second electronic control unit 102 is the representative electronic control unit for threshing function C, as well as function data Dc and the third function identifying data set Rc.

Referring to FIG. 14(*b*), the non-volatile memory 120*c* in the third electronic control unit 103 stores in advance (has specified therein) the first function representation identifying data set Ta indicating that the third electronic control unit 103 is the representative electronic control unit for travel control function A, as well as function data Da to Dc and the first to third function identifying data sets Ra to Rc.

Referring to FIG. 14(*c*), the non-volatile memory 120*c* in the fourth electronic control unit 104 stores in advance (has specified therein) the second function representation identifying data set Tb indicating that the fourth electronic control unit 104 is the representative electronic control unit for reaping function B, as well as function data Da and Db and the first and second function identifying data sets Ra and Rb.

Referring to FIG. 14(*d*), the non-volatile memory 120*c* in the sixth electronic control unit 106 stores in advance (has specified therein) the fourth function representation identifying data set Td indicating that the sixth electronic control unit 106 is the representative electronic control unit for engine actuation function D, as well as function data Dd and the fourth function identifying data set Rd.

Each of the first to seventh electronic control units 101 to 107 allows, in response to an input operation from the operator, updating/changing of the first to fourth function representation identifying data sets Ta to Td stored (specified) in the non-volatile memory 120*c*.

In order for the first to sixth electronic control units 101 to 106 to record history record information (e.g., history and accumulated information) as necessary, the representative electronic control unit communicates with the other electronic control unit(s) controlling the common function to obtain accumulated information on common function data about the common function and record the accumulated information in association with those individual, other electronic control unit(s) (together with its device identifying information set/their device identifying information sets).

Specifically, in order for the first, third, and fourth electronic control units 101, 103, and 104 to record history record information on function data Da about travel control function A as necessary, the third electronic control unit 103, which is the representative electronic control unit for travel control function A, communicates with the first and fourth electronic control units 101 and 104 (other electronic control units for common travel control function A) over the first network N1 (see FIG. 4) to obtain accumulated information on common function data Da about travel control function A (common function) and record the accumulated information in the non-volatile memory 120*c* together with the first and fourth device identifying information sets KS1 and KS4 (here, the address information [0001] and [0004]) of the first and fourth electronic control units 101 and 104 (other electronic control units for common travel control function A) (see FIG. 14(*b*)).

In order for the third and fourth electronic control units 103 and 104 to record history record information on function data Db about reaping function B as necessary, the fourth electronic control unit 104, which is the representative electronic control unit for reaping function B, communicates with the third electronic control unit 103 (other electronic control unit for common reaping function B) over the first network N1 to obtain accumulated information on common function data Db about reaping function B (common function) and record the accumulated information in the non-volatile memory 120*c* together with the third device identifying information set KS3 (here, the address information [0003]) of the third electronic control unit 103 (other electronic control unit for common reaping function B) (see FIG. 14(*c*)).

In order for the first to third electronic control units 101 to 103 to record history record information on function data Dc about threshing function C as necessary, the second electronic control unit 102, which is the representative electronic control unit for threshing function C, communicates with the first and third electronic control units 101 and 103 (other electronic control units for common threshing function C) over the first network N1 to obtain accumulated information on common function data Dc about threshing function C (common function) and record the accumulated information in the non-volatile memory 120*c* together with the first and third device identifying information sets KS1 and KS3 (here, the address information [0001] and [0003]) of the first and third electronic control units 101 and 103 (other electronic control units for common threshing function C) (see FIG. 14(*a*)).

In order for the fifth and sixth electronic control units 105 and 106 to record history record information on function data Dd about engine actuation function D as necessary, the sixth electronic control unit 106, which is the representative electronic control unit for engine actuation function D, communicates with the fifth electronic control unit 105 (other electronic control unit for common engine actuation function D) over the second network N2 (see FIG. 4) to obtain accumulated information on common function data Dd about engine actuation function D (common function) and record the accumulated information in the non-volatile memory 120c together with the fifth device identifying information set KS5 (here, the address information [0005]) of the fifth electronic control unit 105 (other electronic control unit for common engine actuation function D) (see FIG. 14(d)).

Meanwhile, the computer 200, in the list information generating step, generates unit-specific function list information LD2 containing information on the representative electronic control units.

Figure 15:
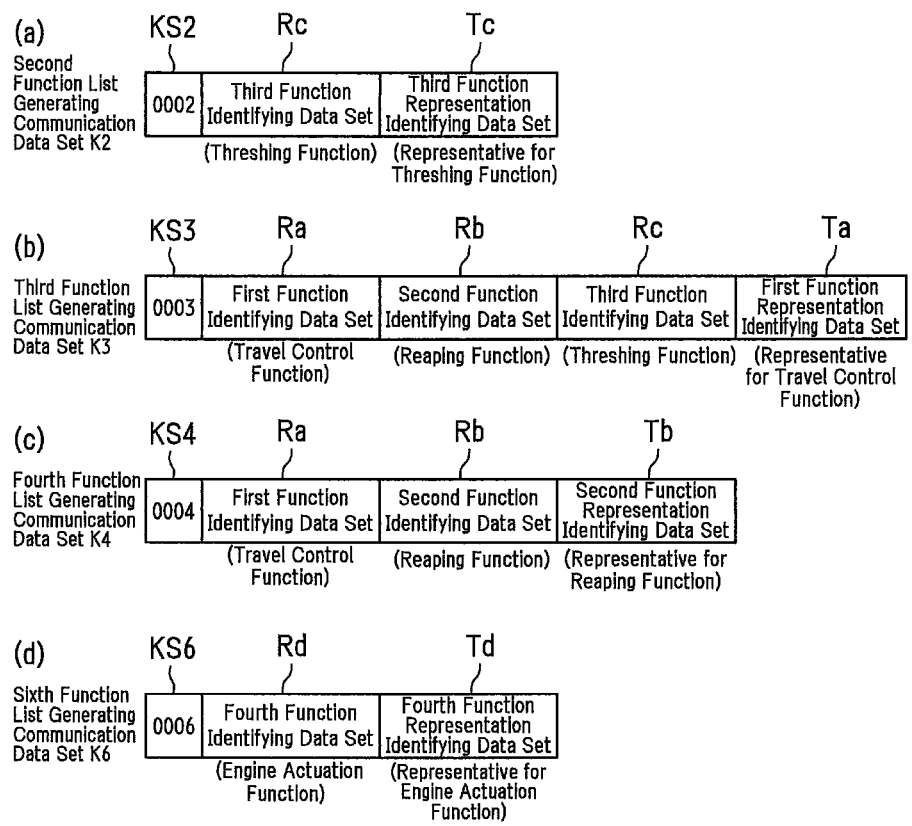
FIG. 15 is a schematic configuration diagram showing an exemplary data structure for a second, a third, a fourth, and a sixth function list generating communication data set according to the second embodiment, with (a) to (d) showing a data structure for the second, the third, fourth, and sixth function list generating communication data sets respectively.

FIG. 15 is a schematic configuration diagram showing an exemplary data structure for the second, third, fourth, and sixth function list generating communication data sets K2, K3, K4, and K6 (representative electronic control units are designated) in a system in accordance with the second embodiment. FIGS. 15(a) to 15(d) show a data structure for the second, third, fourth and sixth function list generating communication data sets K2, K3, K4, and K6 respectively. The data structure of the first, fifth, and seventh function list generating data sets K1, K5, and K7 in the second embodiment may be the same as the aforementioned example of the data structure of the first, fifth, and seventh function list generating data sets K1, K5, and K7 in the first embodiment (see FIG. 7(a), FIG. 7(e), and FIG. 7(g)). No further description will be given about the data structure of the first, fifth, and seventh function list generating data sets K1, K5, and K7 in the second embodiment and about processes implemented in the list information generating table generating step in relation to the first, fifth, and seventh electronic control units 101, 105, and 107 on the basis of the first, fifth, and seventh function list generating data sets K1, K5, and K7. FIG. 16 is table TB2 showing exemplary unit-specific function list information LD2 in the system in accordance with the second embodiment (representative electronic control units are designated). In FIG. 16, the heading "Rep." indicates a memory area for the representative electronic control unit.

Referring to FIG. 15(a), the second function list generating communication data set K2 contains, as well as the third function identifying data set Rc, the third function representation identifying data set Tc indicating that the second electronic control unit 102 is the representative one of the first to third electronic control units 101 to 103 for common threshing function C.

Referring to FIG. 15(b), the third function list generating communication data set K3 contains, as well as the first to third function identifying data sets Ra, Rb, and Rc, the first function representation identifying data set Ta indicating that the third electronic control unit 103 is the representative one of the first, third, and fourth electronic control units 101, 103, and 104 for common travel control function A.

Referring to FIG. 15(c), the fourth function list generating communication data set K4 contains, as well as the first and second function identifying data sets Ra and Rb, the second function representation identifying data set Tb indicating that the fourth electronic control unit 104 is the representative one of the third and fourth electronic control units 103 and 104 for common reaping function B.

Referring to FIG. 15(d), the sixth function list generating communication data set K6 contains, as well as the fourth function identifying data set Rd, the fourth function representation identifying data set Td indicating that the sixth electronic control unit 106 is the representative one of the fifth and sixth electronic control units 105 and 106 for common engine actuation function D.

In the list information generating step, as shown in FIG. 14(a), since the second electronic control unit 102 possesses function data Dc about threshing function C and is also the representative electronic control unit for threshing function C, the second electronic control unit 102 returns to the computer 200 a message containing the second function list generating communication data set K2 (specifically, the third function identifying data set Rc and the third function representation identifying data set Tc shown in FIG. 15(a)) indicating that it possesses function data Dc about threshing function C and is also the representative electronic control unit for threshing function C. The control unit 250 in the computer 200 checks the status of the second function list generating communication data set K2 (specifically, determines that the third function identifying data set Rc is present and also that the second electronic control unit 102 is the representative electronic control unit for threshing function C), recognizes that the second electronic control unit 102 possesses function data Dc about threshing function C and is also the representative electronic control unit for threshing function C, and sets a flag to true in a memory area which identifies threshing function C in the second electronic control unit 102 in table TB2 shown in FIG. 16 and a flag to true in a memory area which identifies the representative electronic control unit for threshing function C.

Also in the list information generating step, as shown in FIG. 14(b), since the third electronic control unit 103 possesses function data Da, Db, and Dc about travel control function A, reaping function B, and threshing function C and is also the representative electronic control unit for travel control function A, the third electronic control unit 103 returns to the computer 200 a message containing the third function list generating communication data set K3 (specifically, the first to third function identifying data sets Ra to Rc and the first function representation identifying data set Ta shown in FIG. 15(b)) indicating that it possesses function data Da, Db, and Dc about travel control function A, reaping function B, and threshing function C and is also the representative electronic control unit for travel control function A. The control unit 250 in the computer 200 checks the status of the third function list generating communication data set K3 (specifically, determines that the first to third function identifying data sets Ra to Rc are present and also that the third electronic control unit 103 is the representative electronic control unit for travel control function A), recognizes that the third electronic control unit 103 possesses function data Da, Db, and Dc about travel control function A, reaping function B, and threshing function C and is also the representative electronic control unit for travel control function A, and sets a flag to true in a memory area which identifies travel control function A, reaping function B, and threshing function C in the third electronic control unit 103 in table TB2 shown in FIG. 16 and a flag to true in a memory area which identifies the representative electronic control unit for travel control function A.

Also in the list information generating step, as shown in FIG. 14(c), since the fourth electronic control unit 104 possesses function data Da and Db about travel control function A and reaping function B and is also the representative electronic control unit for reaping function B, the fourth electronic control unit 104 returns to the computer 200 a message containing the fourth function list generating communication data set K4 (specifically, the first and second function identifying data sets Ra and Rb and the second function representation identifying data set Tb shown in FIG. 15(c)) indicating that it possesses function data Da and Db about travel control function A and reaping function B and is also the representative electronic control unit for reaping function B. The control unit 250 in the computer 200 checks the status of the third function list generating communication data set K4 (specifically, determines that the first and second function identifying data sets Ra and Rb are present and also that the fourth electronic control unit 104 is the representative electronic control unit for reaping function B), recognizes that the fourth electronic control unit 104 possesses function data Da and Db about travel control function A and reaping function B and is also the representative electronic control unit for reaping function B, and sets a flag to true in a memory area which identifies travel control function A and reaping function B in the fourth electronic control unit 104 in table TB2 shown in FIG. 16 and a flag to true in a memory area which identifies the representative electronic control unit for reaping function B.

Also in the list information generating step, as shown in FIG. 14(d), since the sixth electronic control unit 106 possesses function data Dd about engine actuation function D and is also the representative electronic control unit for engine actuation function D, the sixth electronic control unit 106 returns to the computer 200 a message containing the sixth function list generating communication data set K6 (specifically, the fourth function identifying data set Rd and the fourth function representation identifying data set Td shown in FIG. 15(d)) indicating that it possesses function data Dd about engine actuation function D and is also the representative electronic control unit for engine actuation function D. The control unit 250 in the computer 200 checks the status of the sixth function list generating communication data set K6 (specifically, determines that the fourth function identifying data set Rd is present and also that the sixth electronic control unit 106 is the representative electronic control unit for engine actuation function D), recognizes that the sixth electronic control unit 106 possesses function data Dd about engine actuation function D and is also the representative electronic control unit for engine actuation function D, and sets a flag to true in a memory area which identifies engine actuation function D in the sixth electronic control unit 106 in table TB2 shown in FIG. 16 and a flag to true in a memory area which identifies the representative electronic control unit for engine actuation function D.

The unit-specific function list information LD2 is thus generated which is a list of functions categorized by electronic control unit (first to seventh electronic control units 101 to 107) and which also contains information on the representative electronic control units.

In the data collecting step, if a common function has been selected in the function selecting step, the computer 200 communicates by using the representative electronic control unit as a communication address on the basis of the unit-specific function list information LD2 (see FIG. 16) containing information on the representative electronic control unit, in order to collect common function data about the common function corresponding to a selection information set.

For example, in the data collecting step, if travel control function A (common function) has been selected in the function selecting step, the third electronic control unit 103, which is the representative electronic control unit for travel control function A, is retrieved from the unit-specific function list information LD2 (see FIG. 16) generated in the list information generating step and stored in the RAM 222 in order to collect function data Da about travel control function A.

The computer 200 communicates by using the third device identifying information set KS3 (here, the address information [0003]) corresponding to the third electronic control unit 103 (representative electronic control unit for travel control function A) thus retrieved as a communication address. Specifically, in the data collecting step, as illustrated in FIG. 14(b), history record information on function data Da about travel control function A stored in association with the individual, first and fourth electronic control units 101 and 104 (together with the first and fourth device identifying information sets KS1 and KS4 (here, the address information [0001] and [0004])), as well as history record information on function data Da about travel control function A of the third electronic control unit 103, is collected from the non-volatile memory 120c in the third electronic control unit 103 (representative electronic control unit for travel control function A).

The second embodiment generates the unit-specific function list information LD2 containing information on the representative electronic control unit in the list information generating step. Therefore, simply by communicating with the electronic control unit (e.g., the third electronic control unit 103) which possesses the common function data about the selected common function (e.g., common function data Da about travel control function A), the computer 200 is able to obtain the corresponding function data (e.g., history record information on function data (e.g., function data Da) about travel control function A of the first, third, and the fourth electronic control units 101, 103, and 104) without having to communicate with all the electronic control units (e.g., the first, third, and fourth electronic control units 101, 103, and 104) which possess function data Da about the function(s) (e.g., travel control function A) selected in the function selecting step. That saves function data collecting time about the selected function(s) (e.g., common function data Da about travel control function A).

Embodiment 3

Now, the third embodiment will be described in the following. Note that throughout the third embodiment, those members that are arranged in the same manner as those in the first or second embodiment are indicated by the same reference numerals, with the description focusing on differences between the three embodiments.

If the computer 200 transmits an identical (common, single) disclosure request for a function to be controlled (travel control function A, reaping function B, threshing function C, engine actuation function D, or metering function E) to the first to seventh electronic control units 101 to 107 (specifically, if the computer 200 transmits a disclosure request using address information [9999]) and also if the first to seventh electronic control units 101 to 107 simultaneously transmit a response related to travel control function A, reaping function B, threshing function C, engine actuation function D, and metering function E (specifically, a message containing the first to seventh function list generating communication data sets K1 to K7 (see FIGS. 7 and 15)) in an identical (common, single) format, there could be a collision of the responses from the first to seventh electronic control units 101 to 107. This may result in an additional process of retransmitting the responses and accordingly increase the time to be taken to transmit the responses.

These problems are addressed by the combine harvester 100 of the third embodiment which includes a response time specifying section Qb2 (see a broken line enclosure in FIG. 2) which, in response to an identical (common, single) disclosure request, specifies a different response time for each of the first to seventh electronic control units 101 to 107.

Specifically, the combine harvester 100 is configured so that the computer 200 makes an enquiry to all the first to seventh electronic control units 101 to 107 using the address information [9999], as an identical (common, single) disclosure request for a function controlled by the first to seventh electronic control units 101 to 107.

The response time specifying section Qb2, in response to the enquiry made using the address information [9999], specifies response times t1 to t7 for the first to seventh electronic control units 101 to 107. Each response times t1 to t7 is a sum of a basic response time ts and a unique address calculating time (specifically, address information×1 ms). The basic response time ts is determined taking into consideration a minimally required response time (e.g., about 10 ms) which is a minimum process time for a reception and a transmission. The unique address calculating time is calculated on the basis of unique address information (specifically, [0001] to [0007]).

For example, since the address information for the first electronic control unit 101 is [0001], the response time t1 for the first electronic control unit 101 is 10 ms+[0001]×1 ms=11 ms. Also, since the address information for the second electronic control unit 102 is [0002], the response time t2 for the second electronic control unit 102 is 10 ms+[0002]×1 ms=12 ms. The response times t3 to t7 for the third to seventh electronic control units 103 to 107 are similarly calculated, yielding 13 ms, 14 ms, 15 ms, 16 ms, and 17 ms respectively. By calculating response times in this manner using the unique address information, the first to seventh electronic control units 101 to 107 are each given a unique response times t1 to t7.

Figure 17:
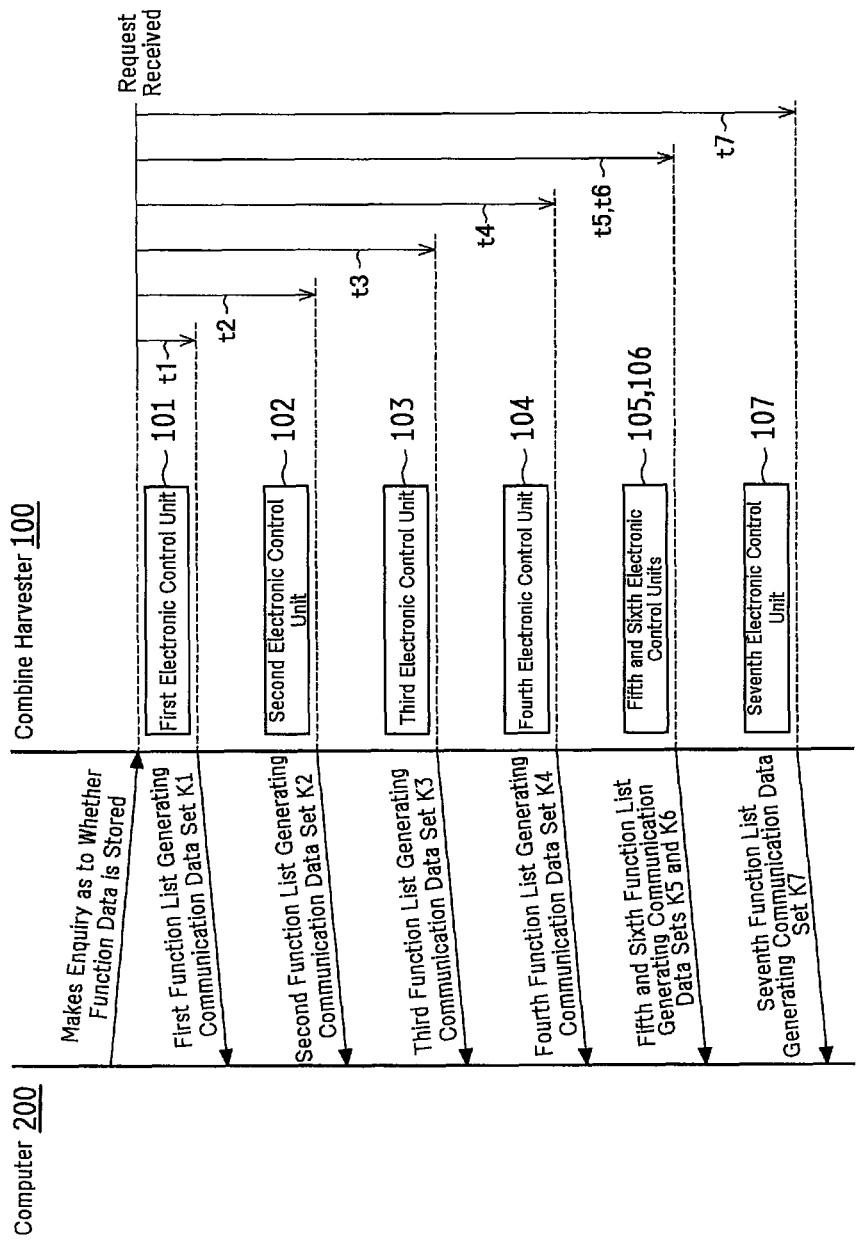
FIG. 17 is an illustration depicting, in a system in accordance with the third embodiment, a first to a seventh electronic control unit responding to identical disclosure requests from a computer.
Figure 18:
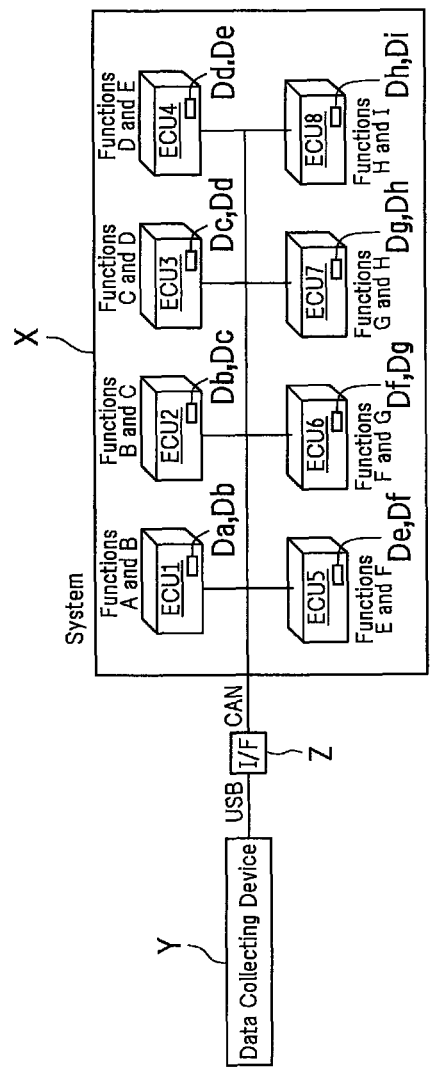
FIG. 18 is a schematic system configuration diagram showing a process in which a conventional data collecting device, connected to a system, collects history record information on function data about various functions.

FIG. 17 is an illustration depicting, in a system in accordance with the third embodiment, the first to seventh electronic control units 101 to 107 responding to identical disclosure requests from a computer 200.

Referring to FIG. 17, as the computer 200 transmits identical (common, single) disclosure requests to the first to seventh electronic control units 101 to 107, the first electronic control unit 101 responds when the response time t1 (e.g., 11 ms) has elapsed since the reception of the disclosure request, and the second electronic control unit 102 responds when the response time t2 (e.g., 12 ms) has elapsed since the reception of the disclosure request. Similarly, the third to seventh electronic control units 103 to 107 respond when the respective response times t3 (e.g., 13 ms) to t7 (e.g., 17 ms) have elapsed since the reception of the disclosure request. In FIG. 17, the fifth and sixth electronic control units 105 and 106 and the fifth and sixth function list generating communication data sets K5 and K6 are represented by single symbols for convenience, the response times t5 and t6 thereby being represented by arrows of the same length. Actually, the response time t5 differs from the response time t6.

According to the third embodiment, if the computer 200 transmits the first to seventh electronic control units 101 to 107 identical (common, single) disclosure requests for corresponding functions, the response time specifying section Qb2 specifies different response times t1 to t7 for the first to seventh electronic control units 101 to 107. Collisions are therefore prevented even if the first to seventh electronic control units 101 to 107 return responses related to the corresponding functions (messages containing the respective, first to seventh function list generating communication data sets K1 to K7) in an identical (common, single) format. That eliminates need for additional steps of retransmitting the responses, which reduces the response transmission time accordingly.

The systems for the first to third embodiments have been combine harvesters. Alternatively, the system may be anything that includes electronic control units controlling various functions. Examples of the system other than the combine harvester, although not limited, may be working machinery (e.g., a tiller and a tractor), building machinery (e.g., an excavator), and ships (e.g., a pleasure boat and a fishing boat).

In addition, the data collecting device has been a laptop personal computer. Alternatively, the data collecting device may be, for example, a mobile terminal, such as a smart terminal having computer functions and wired and/or wireless communications functions.

The present invention may be varied in many ways. Such variations are not to be regarded as a departure from the spirit and major features of the invention. The embodiments and concrete examples described above are therefore for illustrative purposes only and by no means limit the present invention. Accordingly, the scope of the invention should be determined not by the content of the specification, but by the appended claims. Any variations and modifications within the scope of the legal equivalents to the claims are all intended to be included within the scope of the present invention.

The present application claims priority on Japanese Patent Application, Tokugan, No. 2011-029380 filed Feb. 15, 2011 in Japan, the entire contents of which are hereby incorporated herein by reference.

REFERENCE SIGNS LIST

100 Combine Harvester (Example of System)
200 Computer (Example of Data Collecting Device)
101 First Electronic Control Unit
102 Second Electronic Control Unit
103 Third Electronic Control Unit
104 Fourth Electronic Control Unit
105 Fifth Electronic Control Unit
106 Sixth Electronic Control Unit
107 Seventh Electronic Control Unit
A Travel Control Function
B Reaping Function
C Threshing Function
D Engine Actuation Function
E Metering Function
Da Function Data about Travel Control Function
Db Function Data about Reaping Function
Dc Function Data about Threshing Function
Dd Function Data about Engine Actuation Function
De Function Data about Metering Function
LD1 Unit-specific Function List Information
LD2 Unit-specific Function List Information
SN1 First Selection Information Set
SN2 Second Selection Information Set
SN3 Third Selection Information Set
SN4 Fourth Selection Information Set
SN5 Fifth Selection Information Set
Qa1 List Information Generating Section
Qa2 Function Selecting Section
Qa3 Data Collecting Section
Qb1 Representative Electronic Control Unit Designating Section
Qb2 Response Time Specifying Section
t1 First Response Time
t2 Second Response Time
t3 Third Response Time t4 Fourth Response Time
t5 Fifth Response Time
t6 Sixth Response Time
t7 Seventh Response Time

The invention claimed is:

1. A data collecting device communicating with a system including electronic control units controlling various functions to collect function data about the functions, said data collecting device comprising:
   a list information generating section which, before starting to collect function data, communicates with all the electronic control units in the system to recognize the functions controlled by the electronic control units and generate unit-specific function list information which is a list of the functions categorized by function type and by electronic control unit;
   a function selecting section which selects at least one function type about which function data is to be collected; and
   a data collecting section which communicates by using at least one of the electronic control units which corresponds to the at least one function selected by the function selecting section as at least one communication address on the basis of the unit-specific function list information generated by the list information generating section to collect function data about the at least one function corresponding to the selection information,
   wherein at least one of the functions which is controlled distributively by two or more of the electronic control units in the system is designated as a common function for at least two of the electronic control units, and a representative electronic control unit which is either one of the at least two electronic control units communicates with the other electronic control unit to obtain common function data about the common function, the list information generating section generates the unit-specific function list information containing information on the representative electronic control unit, and the data collecting section, in response to the common function selected through the function selecting section, communicates by using the representative electronic control unit as a communication address on the basis of the unit-specific function list information containing information on the representative electronic control unit to collect the common function data about the common function corresponding to the selection information.

2. A system communicating with the data collecting device according to claim 1,
   at least one of the functions which is controlled distributively by two or more of the electronic control units being designated as a common function for at least two of the electronic control units,
   said system comprising a representative electronic control unit designating section designating either one of the at least two electronic control units as the representative electronic control unit.

3. A system communicating with the data collecting device according to claim 1, comprising a response time specifying section which, in response to the data collecting device having transmitted an identical disclosure request for any of the functions to two or more of the electronic control units, specifies a different response time for each of those two or more electronic control units for responding to the identical disclosure request.

* * * * *